United States Patent
Boyd

(10) Patent No.: US 8,251,638 B2
(45) Date of Patent: Aug. 28, 2012

(54) WIND DIVERTER

(76) Inventor: Stephen David Boyd, Hudson, OH (US)

(*) Notice: Subject to any disclaimer, the term of this patent is extended or adjusted under 35 U.S.C. 154(b) by 0 days.

(21) Appl. No.: 12/473,674

(22) Filed: May 28, 2009

(65) Prior Publication Data

US 2009/0297332 A1  Dec. 3, 2009

Related U.S. Application Data

(60) Provisional application No. 61/056,486, filed on May 28, 2008.

(51) Int. Cl.
   F03D 11/00 (2006.01)
   F03D 1/04 (2006.01)
(52) U.S. Cl. ............... 415/1; 415/4.3; 415/4.5; 415/908
(58) Field of Classification Search ............. 415/4.3, 415/4.5, 220, 221, 907, 1, 908
   See application file for complete search history.

(56) References Cited

U.S. PATENT DOCUMENTS

| | | | |
|---|---|---|---|
| 1,764,052 A * | 6/1930 | Pfeifer | 415/186 |
| 4,018,543 A | 4/1977 | Carson et al. | |
| 4,045,144 A | 8/1977 | Loth | |
| 4,079,264 A * | 3/1978 | Cohen | 290/55 |
| 4,154,556 A | 5/1979 | Webster | |
| 4,164,382 A | 8/1979 | Mysels | |
| 4,452,046 A | 6/1984 | Valentin | |
| 4,508,973 A | 4/1985 | Payne | |
| 4,857,753 A * | 8/1989 | Mewburn-Crook et al. | 290/55 |
| 4,935,639 A | 6/1990 | Yeh | |
| 6,246,126 B1 | 6/2001 | Van Der Veken et al. | |
| 6,249,059 B1 | 6/2001 | Hosoda | |
| 6,538,340 B2 | 3/2003 | Elder | |
| 6,755,608 B2 | 6/2004 | Boughton | |
| 6,939,101 B2 | 9/2005 | Yu et al. | |
| 6,981,839 B2 | 1/2006 | Fan | |
| 7,094,017 B2 * | 8/2006 | Kurita | 415/4.2 |

(Continued)

FOREIGN PATENT DOCUMENTS

| | | | |
|---|---|---|---|
| FR | 1009005 | * | 5/1952 |
| JP | 2005-133666 A | | 5/2005 |
| WO | 02/068817 A1 | | 9/2002 |
| WO | 2007048001 A2 | | 4/2007 |

OTHER PUBLICATIONS

PCT/US2009/045470 International Search Report and Written Opinion dated Jan. 7, 2010.

*Primary Examiner* — Edward Look
*Assistant Examiner* — Jesse Prager
(74) *Attorney, Agent, or Firm* — Ward and Smith, P.A.

(57) ABSTRACT

Apparatuses and methods are provided for a wind diverter at least partially encircling a wind turbine support column to direct the wind from an area around a wind turbine to the rotor blades of the wind turbine. The wind diverter may also reduce turbulence and increases the laminar flow of the airstream delivered to the rotor blades. Additionally, the wind diverter increases both the volume of air and the velocity of the airstream reaching the rotor so as to increase the rotor speed. Increasing the rotor speed increases the energy available to the wind turbine. Energy increases as the cube of the rotor speed and the increased energy produces an increase in the power generated by the wind turbine. The wind diverter also allows a wind turbine to begin producing energy at lower initial wind speeds due to the concentration of air.

21 Claims, 17 Drawing Sheets

U.S. PATENT DOCUMENTS

| | | |
|---|---|---|
| 7,484,363 B2 | 2/2009 | Reidy et al. |
| 2002/0015639 A1 | 2/2002 | Roberts |
| 2007/0152454 A1 | 7/2007 | Zambrano et al. |
| 2007/0222225 A1 | 9/2007 | Mahoney |
| 2008/0150292 A1 | 6/2008 | Fedor et al. |
| 2008/0211234 A1 | 9/2008 | Grassi |
| 2009/0290972 A1* | 11/2009 | Farb ................. 415/4.3 |

* cited by examiner

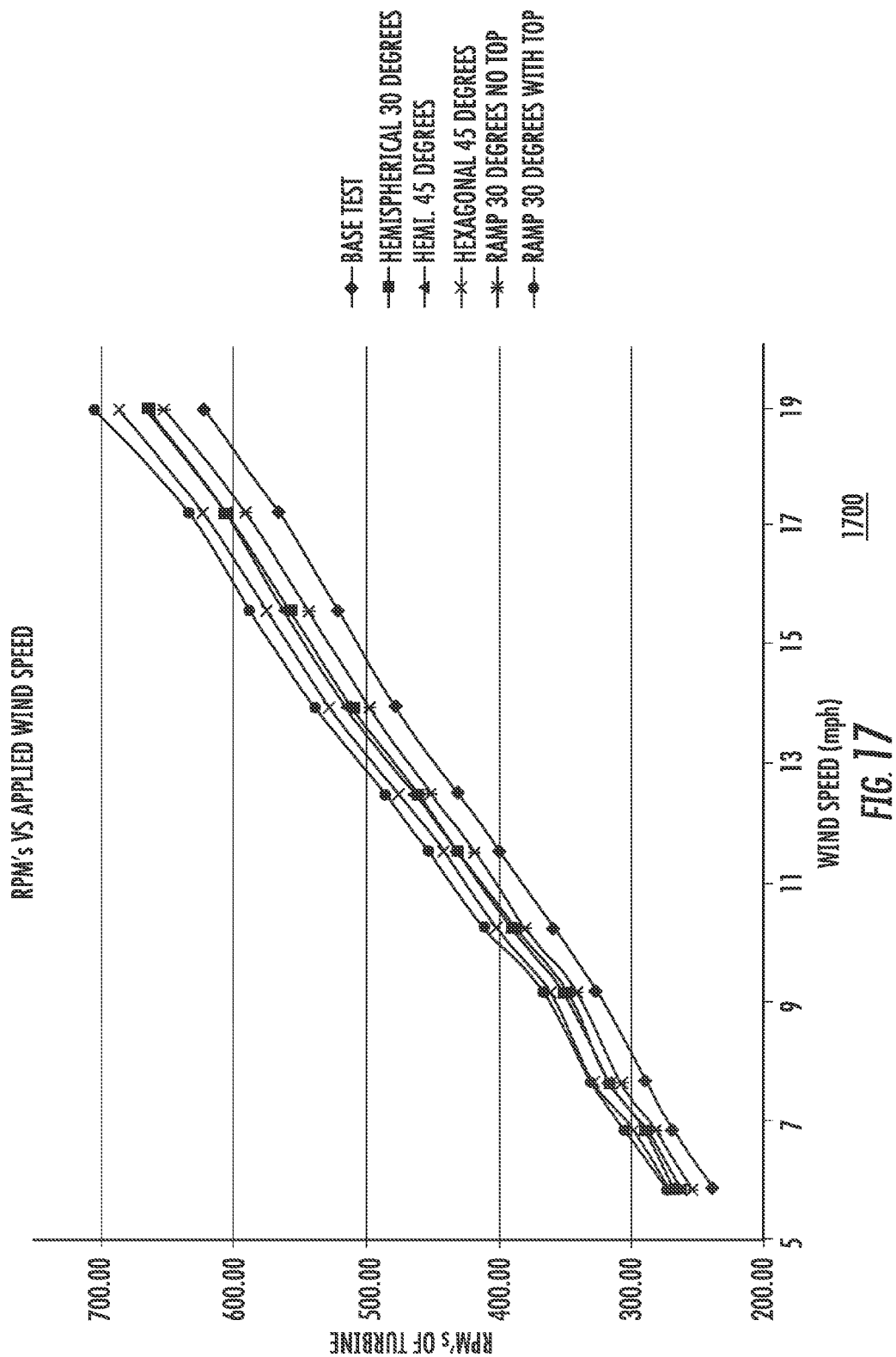

WIND DIVERTER

CROSS-REFERENCE TO RELATED APPLICATIONS

This application is related to and claims priority to U.S. Provisional Patent Application Ser. No. 61/056,486, filed on May 28, 2008, entitled "Wind Diverter," the entire disclosure of which is incorporated by reference in its entirety.

BACKGROUND OF THE INVENTION

1. Technical Field

The invention disclosed herein relates generally to power generation through the use of wind turbines, and more particularly to providing apparatuses and methods for diverting wind so as to increase the flow of wind supplied to the blades of a wind turbine and thus increasing the power generated by the action of the blades.

2. Background Art

The conversion of wind energy into electrical energy is well known. The most common apparatus for converting wind energy into useful power is the wind turbine which typically includes a plurality of blades directly exposed to the wind which are connected to a central hub and rotate about a common horizontal axis.

In older designs of wind turbines, the horizontal axis is permanently aligned with the prevailing wind direction. As a result, the efficiency is reduced when the wind changes from the prevailing direction. In newer and more advanced wind turbine designs, the horizontal axis of the rotor will turn into the wind, either rotating freely to align with the wind or is driven by servomotors.

Although wind turbines are a well known method for harnessing wind energy, they suffer from several inherent disadvantages. Firstly, the rotors must be positioned on tall towers both to capture the faster wind speeds at higher elevations but also to avoid the undesirable effects of air turbulence caused by obstructions at ground level.

Additionally, wind turbines are only able to effectively extract energy from a circular cross section of the airstream. A substantial portion of the airstream passes under, over, and around the area swept by the rotor, limiting its capacity to extract all of the power available from the surrounding wind. Further, large scale wind turbines are only able to start operating in moderately high wind speeds of approximately 7 to 10 miles per hour ("MPH"). This wind speed is not always available, which means that the wind turbine will sit idle and not be able to start operating until such time as the wind speed picks up and reaches the minimum threshold starting speed.

Another limiting factor for large scale wind turbines is that the current design is approaching maximum size. Rotor length is restricted by the material of construction: i.e., aluminum, fiberglass or carbon fiber. The longer the rotor blades, the heavier. Beyond a certain length, they are too long and too heavy to be self supporting. This then becomes the maximum size/power output for a given wind turbine installation.

Some of the original wind farms that were installed positioned the turbines on ridges to take advantage of the natural topography to increase the wind speed going to the rotor and thereby the energy output. In addition, it is possible to position a turbine in a valley between two (2) hills to also take advantage of this natural venturi effect. However, few naturally occurring locations have the correct terrain to produce laminar airflow and to minimize air turbulence while at the same time maximizing the wind speed. If such locations do exist, they often are facing the wrong direction to take advantage of the prevailing wind or are blocked when the wind shifts. Lastly, even if the natural topography is suitable, the location may be too far away to economically tie a remotely located wind turbine into an existing power grid.

A further problem for small scale wind turbines, although ideally sized for some applications such as roof mounting on buildings, is that they are not as efficient as large sized turbines. In addition, due to extreme turbulence at the building parapet and over the top of the building itself, small turbines are only able to produce limited amounts of power.

It has long been recognized that the efficiency of a wind turbine could be improved by directing more wind onto the turbine itself. One of the earliest recorded methods of doing this was the Persian Panemone, a type of vertical axis wind turbine with its axis positioned at 90 degrees to the direction of the wind with the blades moving parallel to the wind. The Persian Panemone consisted of four (4) sails on a vertical axle which turned when the wind blew. The vanes or sails moving upwind had to be blocked by a wall to prevent them from being blown back. As a result, half of the turbine was shielded by the wall, thereby reducing its efficiency.

More recent attempts at concentrating the wind involved shrouds or diffusers or ducted inlets, all names for basically the same design which takes advantage of the venturi effect. Some initial research for these designs was performed by NASA in 1957 as reported in the document "Experimental Investigation of Lift, Drag and Pitching Moment of Five Annular Airfoils". Further studies were conducted throughout the 1960's and 1970's. In the 1990's a full scale device was built by a New Zealand company called Vortec.

As recently as Feb. 3, 2009, U.S. Pat. No. 7,484,363 to Reidy et al. was issued for a venturi type augmenter that completely enshrouds the turbine rotor.

These types of augmentation devices used on wind turbine installations where the rotor turns into the direction of the wind have not proved very successful due to a variety of factors. The main problem is that the opening of the diffuser needs to be exactly in line with the incoming wind. If out of alignment, the shroud will block the airstream. In addition, it was found that even slight misalignment between the throat of the diffuser and the direction of the wind causes the air flow to go from laminar to turbulent, greatly reducing the efficiency.

Designs to prevent this misalignment have included mounting the diffuser on the yaw mechanism that orients the rotor in the direction of the wind. This greatly complicates the design of the support tower and the yaw mechanism required to rotate both the diffuser and the rotor itself. It was found on the turbines with built-in diffusers, that it is quite difficult to rotate the assembly fast enough to maintain the correct alignment.

U.S. Pat. No. 6,755,608 to Boughton ("Boughton") discloses emplacing a wind power generation apparatus either on top of, or adjacent to, a natural or artificial mound so as to increase the height of the wind power generation apparatus and provide some focus of the wind on the turbine rotor of the apparatus. Boughton also discloses the emplacement of wind power generation apparatuses so as to take the greatest advantage of artificial mounds, such as those created by piling up refuse in a landfill. In addition, in Boughton, support towers upon which the wind power turbine towers are emplaced may be installed with collapsible supports such as a jacking mechanism or a telescoping support tower. Boughton also discloses an inflatable structure either together with supports or separately constructed, such that the support towers may be raised as the artificial mound grows. The system of Boughton may also contain a hinge at the base of the wind power turbine to provide for ease of access when maintenance on the wind turbine itself is required.

The prior art system as disclosed in Boughton has numerous disadvantages. An initial disadvantage is the requirement for reinforcement of the artificial mound to support the weight of the wind power generation apparatus on top of the artificial mound. Wind power generation systems are often quite large, as seen in the example of a wind power generation system installed in Bowling Green, Ky. where the wind power generation unit stands 256 feet tall with a blade length of 134 feet. Thus, supporting the weight of an apparatus of this size on top of an artificially produced mound would require some careful engineering with regard to materials and stability of the finished mound configuration. Engineering of this complexity would increase both the time of construction and cost of such a mound significantly.

Another disadvantage of the system disclosed in Boughton is that attempting to add a mound to already existing wind power generation emplacements would be even more costly in terms of engineering and construction due to the need to first remove the existing installation, build the mound, then reinstall the wind power generation unit. The return on investment in such an installation based upon the increase in power generation sales would be so long as to render such a retrofit economically unfeasible.

An additional disadvantage of the prior art system as disclosed in Boughton is that the area from the top of the mound to the bottom of the blade of the wind generation turbine is open. This open area allows for the escape of wind accelerated by the mound by passing through the open area without doing any work pushing against the rotor blades.

BRIEF SUMMARY OF THE INVENTION

In one embodiment, the invention is directed to a wind diverter apparatus for delivering a focused airstream flow from an area surrounding a wind turbine to rotor blades of the wind turbine comprising a frame having sections with high strength supports covered in lighter weight air resistant materials. The frame may be composed of angled portions and flat portions connected together such that the angled portions extend from an installation grade level and connect to the flat portion at a distal end of the angled portion. The flat portion of the frame may have a width at least the same measurement as the rotor arc of a wind turbine and the flat portion of the frame when connected to the angled portion having a height equivalent to the bottom tip of the rotor arc of the wind turbine less a pre-determined clearance amount. The apparatus is installed at least partially encircling a support column of the wind turbine so as to concentrate an airstream on the front bottom portion of the wind turbine rotor blades.

The frame high strength support members of the apparatus comprise high strength materials generally selected from the group consisting of steel pipe, aluminum pipe, steel cable, rope, and structural carbon fiber rods. The frame light weight air resistant coverings are generally selected from the group consisting of plastic sheeting, sail cloth, fiberglass cloth, and canvas or any other light weight, air-resistant material. The frames of the wind diverter are generally constructed by forming the frame shape from the high strength support members and completing the formed frame shape by covering the high strength support members with the light weight air resistant covering.

The flat portion of the apparatus may be configured as a square, rectangle, or other polygon shape, where each edge of the flat portion is connected to a distal edge of an angled portion through a rounded curve to smooth the transition from the angled portion to the flat portion of the apparatus. The wind diverter apparatus may be independent of the wind turbine support column or can be connected to the wind turbine by direct attachment of the flat side of the extended top of the wind diverter apparatus.

The frame of the wind diverter apparatus may further comprise spill vanes installed in a vertical orientation at the joints between angled frame portions. An additional focusing portion of the wind diverter may consists of a semi-circular chute connected to the top of the flat portion of the frame and oriented in front of the rotor such that the semi-circular chute further focuses an airstream arriving at the flat portion of the ramp into the rotor blades of a wind turbine. The flat portion of the apparatus may also have a recessed portion in the center of the flat portion, positioned directly below the bottom tip of the rotor blade and of sufficient depth to provide the clearance required by the rotor blade to avoid impacting the flat top of the apparatus frame.

In another embodiment, a method for directing an airstream to the rotor of a wind turbine is provided. The method includes constructing a frame comprising at least one angled portion and at least one flat portion and installing said frame in an interposed position between the direction of a prevailing wind flow and the front portion of a wind turbine rotor. The flat portion of the frame when connected to the angled portion of the frame has a height equivalent to the bottom tip of the rotor arc of the wind turbine above grade less a pre-determined clearance amount. The method further includes installing the frame at least partially encircling a support column of the wind turbine so as to concentrate an airstream on the front bottom portion of the wind turbine rotor blades.

It is therefore an object to provide apparatuses and methods for the diversion of wind up to the rotor blades of a wind driven turbine to increase the wind speed of the available wind such that the increase in the wind speed impacting the rotor blades results in an increase in power generated by the wind driven turbine.

An object of the present invention having been stated hereinabove, and which is addressed in whole or in part by the present invention, other objects will become evident as the description proceeds when taken in connection with the accompanying drawings as best described hereinbelow.

BRIEF DESCRIPTION OF THE DRAWINGS

FIG. 17 is a view of a chart representing the change in wind turbine rotor RPM vs. the applied wind speed at the rotor blades.

DETAILED DESCRIPTION OF THE INVENTION

Figure 1:
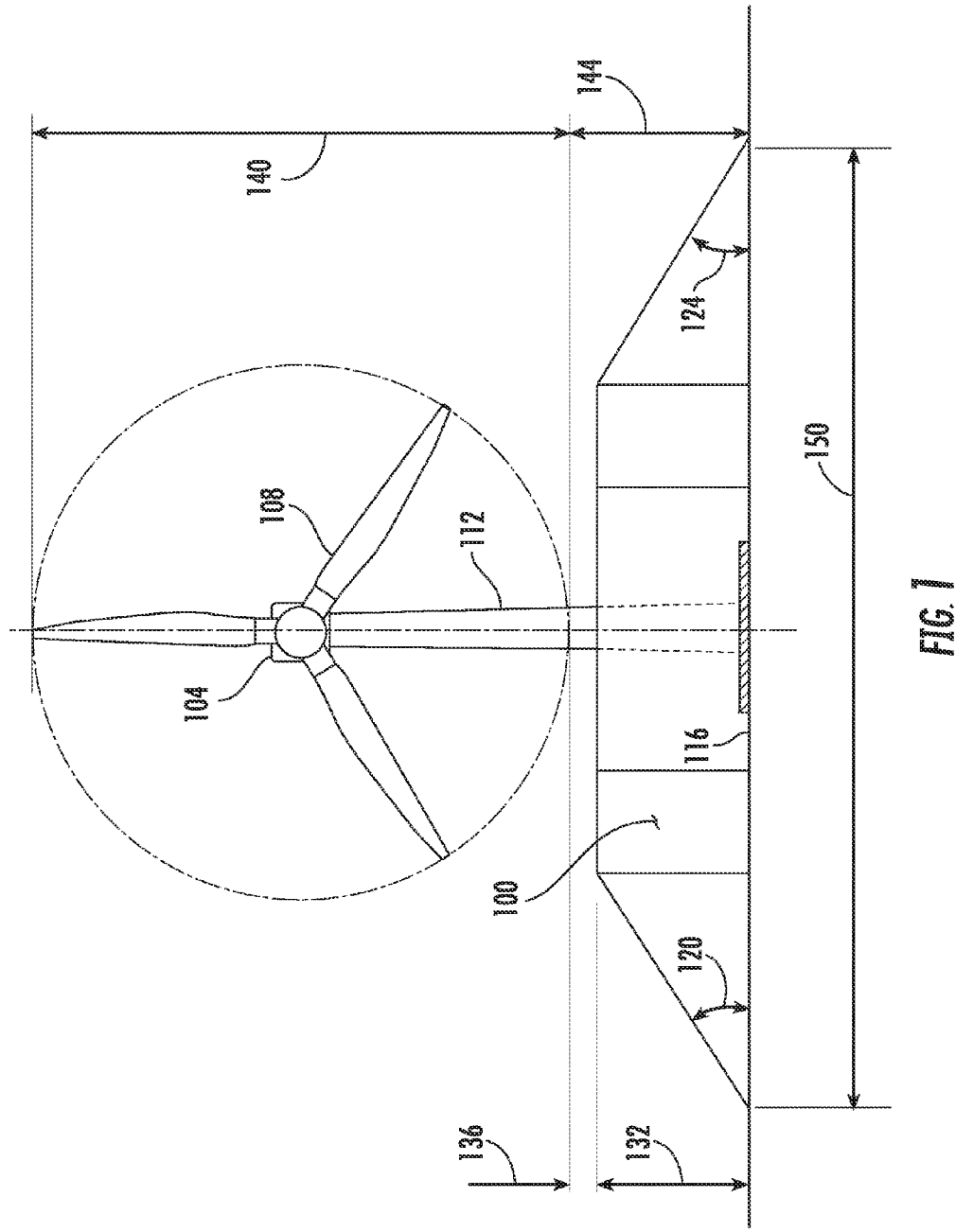
FIG. 1 is an exemplary front view of a wind diverter with a hexagonal cross section.

Current wind turbine design is based upon building the turbines as high as possible in order to raise the rotors as high as possible. Wind speeds are faster at higher elevations and current wind turbine designs seek to capture as much of these higher wind speeds as possible.

One of the limiting factors in current wind turbine design is the length of the rotor blades. Rotor blade length is restricted by the material of construction; i.e. aluminum, fiberglass or carbon fiber, to name a few. A limiting factor for the design of a wind turbine is that the maximum size of a rotor blade is dictated by the material of construction and current designs are reaching their maximum blade length for the materials of construction currently available. The total wind turbine height is therefore determined by the hub height plus the rotor blade length, with the rotor blade length restricted by the materials of construction available for use.

With these design parameters in mind, the rotor tip clearance, defined as the distance between the bottom of the rotor blade and the ground at grade level, is a significant height above the ground level. The tip clearance depends upon the manufacturer of the wind turbine and the manufacturer's specific turbine design, however, typical tip clearances for large size wind turbines may range from 49 feet to more than a 130 feet. This presents a very large distance between the ground and the bottom tip of the rotor blades in which there is no opportunity to capture the energy from wind passing through this open area.

The wind passing through this open area between the ground and the bottom tip of the rotor blade is normally lost to use. However, by the advent of emplacing a wind diverter in the open area below the tips of the rotor blades as contemplated herein, this wind and the power associated therewith can be captured by lifting the wind up to the elevation of the rotor such that the wind impacts upon the rotor blades.

As an additional issue, wind farm installations may position the turbines on ridges to take advantage of the natural topography to increase the wind speed going to the rotor and thereby the energy output. In addition, it is possible to position a turbine in a valley between two (2) hills to also take advantage of this natural venturi effect. However, few naturally occurring locations have the correct terrain to produce laminar airflow and to minimize air turbulence while at the same time, to maximize the wind speed. If such locations do exist, they often are facing the wrong direction to take advantage of the prevailing wind or are blocked when the wind shifts. Lastly, even if the natural topography is suitable, the location may be too far away to economically tie a remotely located wind turbine into an existing power grid.

A further problem for small scale wind turbines, although ideally sized for some applications such as roof mounting on buildings, is that they are not as efficient as large sized turbines. In addition, due to extreme turbulence at the building parapet and over the top of the building itself, small turbines are only able to produce limited amounts of power.

There are a number of benefits associated with the diversion of the wind from the ground up to the rotor blades. A primary benefit is that when the volume of air that normally flows in the open space described is diverted, it increases the velocity of the wind that impacts the rotor blades as the wind is diverted up to the rotor. Most significantly, in current wind turbine operation the wind speed at the top of the rotor blade arc is typically faster than the wind speed at the bottom of the rotor blade arc. Depending upon wind conditions, the wind speed increase caused by the wind diverter may balance wind speeds at the bottom of the rotor blade arc with the wind speed at the top of the rotor blade arc.

The increase in velocity in turn causes an increase in the power generated by the wind turbine. The power is increased as the cube of the increase in wind velocity. Wind tunnel testing has shown that the increase in efficiency caused by the wind diverter contemplated herein will most likely be in the range of 15% to 30% of output and could exceed 50%.

A second benefit is with regard to the start up wind velocity required to begin turning the rotor blades to generate power. It may be possible that by diverting the wind the actual start-up wind speed for normal operation may be lowered. Many manufacturers design their wind turbines to start at wind speeds of approximately 7 to 10 MPH. The normal start-up wind speed is measured at the hub of the turbine, with the wind speed at the top of the rotor blade arc being higher and the wind speed at the bottom of the rotor blade arc slower than the normal start-up wind speed. Generally, the wind in the upper half of the rotor will contribute to the required start-up wind velocity. If the wind speed can be increased at the bottom of the rotor, it may contribute a significant portion of the velocity required for start-up. As a result, the wind turbine will be able to operate in lighter wind conditions and this will, in turn, increase the number of operating hours. The increase in the number of operating hours increases the overall efficiency of a given wind turbine as it may operate when wind speeds would normally be too low to effect start-up due to the addition of the diverted wind against the bottom of the rotor blades. Current overall operational efficiencies of wind turbine installations may be 40% or less without wind diversion.

Other possible benefits of the wind diverter contemplated herein include reduced maintenance and the ability to retrofit a wind diverter on an existing wind turbine to achieve the benefits of increased efficiency and power output. The current wind turbine design greatly stresses the rotor bearings due to the differences in wind speeds between the upper tip of the rotor blades and the bottom tip of the rotor blades. This wind speed differential puts torque on the bearings which reduces their lifespan. Better balancing of the wind speeds between the top and bottom of the rotor blades reduces the torque on the bearings and proportionally reduces the stress on the bearings. This reduced stress results in longer bearing life and less frequent required maintenance.

The design of the wind diverter is such that it may be installed on an existing wind turbine. As will be recited below, the wind diverter is constructed of relatively light weight materials constructed in panels which may be pipe or wire frames covered with materials such as plastic sheeting, sail cloth, fiberglass cloth, canvas, or any other material that has a high strength to weight ratio. The invention may be independent of the wind turbine support column or may be manufactured in a fashion such that the wind diverter can be attached to existing wind turbines, thereby increasing their efficiency and power generation output over and above existing power generation output.

A horizontal surface at the top of the ramp or slope generally increases the efficiency of the wind diverter. Taking advantage of the Coanda effect, the horizontal surface will help to change the upwards angular direction of the wind to horizontal and keep the flow laminar. The flat top is critical to the optimum performance of the wind diverter. Both computational studies and wind tunnel testing have shown that an angled ramp by itself is very inefficient in terms of increasing the wind speed at the face of the rotor (see FIG. 16).

An additional exemplary construction requirement is a rounded curve at the top of the ramp where the ramp connects to the flat horizontal surface. This curve helps to smooth the transition from the angled ramp to the top horizontal surface.

A wind diverter device that is not limited to the existing topography; that could take advantage of the additional wind flowing below the wind turbine rotor but which presently bypasses the rotor; that could reduce or eliminate turbulence; that could allow the wind turbine to start up in lower wind speeds, and which is designed to increase the power output of the wind turbine, would be a significant improvement on the current state of the art.

The wind diverter device is intended to be universal in its application. It can be installed on any wind turbine design from any wind turbine manufacturer. In addition, for any wind turbine manufacturer, it can be installed on any of their different sizes or models of turbines. The wind diverter can be custom designed to be used with all of the different makes, models and sizes of wind turbines.

The wind diverter can be utilized on any new wind turbine installation. In some cases, the designer of the wind turbine may be able to reduce the height of the support tower and/or the diameter of the rotor to take advantage of the increased efficiency created by the diverter. This will reduce the initial capital and erection costs of the turbine while, at the same time, still achieving the same power output with the smaller unit.

The wind diverter can also be retrofitted on existing wind turbine installations, depending on the space available surrounding the wind turbine. This will allow an existing wind turbine installation to generate more power than that for which it was originally designed.

The wind diverter can be custom designed to take advantage of any naturally occurring topographical land features to augment the wind flowing over the device. For instance, if the wind turbine is located on a slope or hill, the ramp of the diverter can be designed to maintain the same angle of the approach slope. This will reduce turbulence and further increase the wind speed that could have been developed by the wind diverter alone.

If there are land features such as troughs or depressions in the area surrounding the wind turbine that lead to an increase in the air turbulence, the wind diverter can help to smooth out and eliminate the effect of some of the detrimental land features. In addition, depending on site conditions, the final size of the wind diverter may need to be smaller or larger, even for the same size wind turbine. It may not always be possible to achieve the maximum ideal efficiency, but the wind diverter may be custom designed more readily due to the nature of the construction of the wind diverter to conform to the actual site conditions to achieve the maximum possible efficiency.

In addition to the installation of the present invention, it may prove beneficial to include a hoist for lowering and raising the structure, both for initial installation and when it needs to be lowered for future maintenance and repairs. Another benefit may be to tie the hoist into the main controls for the wind turbine so that in the event of high wind conditions, the entire structure can be lowered, both to protect the wind turbine itself as well as the wind diverter. It may be possible to design the lifting system with individual hoists to automatically raise and lower individual panels depending on the prevailing wind direction. In so doing, it may be possible to maximize the efficiency of the wind turbine for a given wind direction.

The wind diverter does not interfere with the design or operation of the wind turbine itself. It is an independent structure separate from the turbine. As such, it is does not require any re-engineering or rebuilding of existing turbine designs and/or installations. The full scale wind diverter is omni directional. In other words, the wind diverter is not dependent on a prevailing or predominant wind direction to be able to create an increase in the wind speed directed to the wind turbine rotor and thereby any increase in the power output.

Referring now to FIG. 1, an exemplary front view of a wind diverter 100 having a hexagonal cross-section is shown. The hexagonal shape of the wind diverter 100 refers to the six-sided shape of the flat platform that extends at clearance 136 level below the bottom tip of the rotor 108. In this exemplary view the wind turbine device 104 consists of a support column 112 upon which is mounted a turbine 104 and a rotor 108. The rotor 108 in this view, by way of example, has three rotor blades upon which the wind impacts to cause the rotor 108 to turn. Other wind turbine 104 devices may have more or fewer blades for wind impact, however, the wind diverter 100 may be used with all current wind turbine devices currently in production.

The wind diverter 100 consists of a number of side panels that have one end on the ground 116 and the other end attached at a pre-determined ramp angle (120, 124) to the flat hexagonal-shaped platform beneath the rotor 108. A hexagonal-shaped wind diverter 100 requires both rectangular side panels 412 and triangular side panels 416 in its construction (see FIG. 4). However, the panels may be constructed via several possible methods. The main criteria for designing and constructing the wind diverter 100 are that it be able to withstand the maximum wind loads as well as any rain or snow loads that would be imposed.

For large wind turbine installations, one possible method of building the wind diverter 100 would be a tensioned fabric type structure. This type of construction would consist of fabric such as canvas or fiberglass or light weight plastic sheeting stretched over wires which are held in position by support towers. Support towers could be monopole type or lattice type. Around the support column 112 for the turbine 104, depending on turbine 104 size, it may be possible to use a ring to keep the support wires independent of the support column 112. For some installations, it may be necessary to use interior towers in order to suspend the wires.

If permitted by the wind turbine supplier, it may be possible to connect the wires directly to the main wind turbine support column 112. However, a careful check of the effect that the additional loading would have on the support column 112 and its foundation would need to first be undertaken to be certain that they could withstand the added loads. The advantage of this type of construction is that it could be easily disassembled, particularly for the half of the wind diverter that may require disassembly for future maintenance on the bearings or rotor 108.

The width of the wind diverter 100 top surface is determined by the rotor diameter 140. Ideally, the top surface width should be equivalent to the rotor diameter, but may be up to 1.1 to 1.3 times the rotor diameter 140. For the prevailing wind direction, this would prevent side slippage of the airstream around the edges of the polygon, which is hexagonal in cross section in this exemplary figure. The overall ramp length or width 150 is the width of the wind diverter 100 top surface plus 2 times the width contribution of the ramp panels. The width contribution of the ramp panels is a function of the length of the ramp, the angle that the ramp forms with the ground 116, and any site specific adjustments that must be made to accommodate the wind diverter 100. For small wind turbines a surface width of up to 2 times the rotor diameter 140 should be achievable and cost effective. For large wind turbines, the increase in size of the wind diverter 100 above the width of the rotor diameter 140 may not be economical. Additionally, the polygon-shaped wind diverter 100, such as the hexagon shown in FIG. 1, should be oriented so that one of the rectangular panels 412 of the ramp faces the prevailing wind direction.

The wind diverter ramp height 132 is a function of the height necessary to accommodate the operation of the rotor 108. In the exemplary configuration shown in FIG. 1, the height of the wind diverter 100 is the height from the ground 116 to the bottom of the rotor distance 144, less a clearance distance 136. The clearance 136 is calculated such that the bottom of the rotor blades will not come into contact with the wind diverter 100, but also provides a safety margin to allow for sag or mechanical strain that might cause the rotor blades to drop below their initial installation height. The ramp height 132 of the wind diverter 100 will be specific to each individual wind turbine installation.

The wind diverter 100 requires a ramp, or sloped surface, to raise the wind from the ground level to a point below the bottom of the rotor 108 arc. It was found in both computational studies and in wind tunnel testing, that the smaller the approach angle, the greater the increase in wind speed at the rotor blades and the corresponding energy output. The ramp or sloped surface will have a ramp angle 120. This angle can range from 10 degrees to 75 degrees. For ramps with a flat top surface, the ideal approach angle would be 15 degrees. The most suitable ramp angles (120, 124) in terms of efficiency, space utilization, and size and cost of wind diverter 100, would be 30 degrees. The actual angle used will be dependent on a number of factors including the space available around wind turbine for installation of the wind diverter 100, and the natural terrain available around wind turbine. An alternative ramp design would have an airfoil design or "S" shape 1400 (see FIG. 14).

For large Wind Turbine installations, the full device may be split into two (2) half sections. The first half section is permanent and need not be removed or disassembled. The second half section is semi-permanent and may need to be disassembled in whole or in part. This semi-permanent half should be located at the base of the wind turbine where it is accessible. The reason for this is that access with a crane to the area around the base of the turbine may be necessary for future bearing or rotor replacement. Generally these repairs need only be made from one side of the wind turbine so that only half of the device needs to be removable. In the case of a large wind turbine installation, the device may be constructed using standard solid building/roof construction techniques. This might be particularly advantageous for the permanent half of the device and it may be possible to make use of the building underneath, such as for electrical switch gear or electrical power storage devices. For small wind turbine installations, the full device could also to be built in two (2) half sections for ease of assembly around the wind turbine support column. However, both halves can be one piece assemblies to facilitate both assembly and any future disassembly that is required.

In another embodiment, the permanent half of the device could be formed of earthen works depending on the availability of suitable fill material. For the semi-permanent half of the device, much of it could also be formed of earthen works. The remainder of this semi-permanent half could be constructed of materials and in a manner as recited above. Space for lifting crane access would need to be provided. Size of this access area would depend on the diameter of rotor, location from where the rotor would need to be raised and lowered, and the size of the lifting crane itself. Some access space might also need to be provided for raising and lowering items from the back of the nacelle for repair and maintenance of smaller items such as the gearbox, bearings, etc.

One additional feature contemplated herein are hatch accessories. In order to facilitate maintenance, a hatch can be installed in the top horizontal flat surface through which spare parts can be raised and lowered from the back of the nacelle. The hatch can be designed to be either manually or automatically opened. The hatch size should be large enough for the largest spare part to pass through. To also facilitate maintenance, a hatch can be installed in the sloped ramp. The opening in the ramp should be large enough to allow a truck to pass through and into the interior of the semi-permanent half of the device. In addition, the opening size should be large enough to accommodate the largest size spare part when loaded on the truck. A staging area inside of the semi-permanent half of the device can also be provided. This area would be used for preparing the spare parts for lowering and raising to the nacelle. It should be clear of any internal supports. In addition, the span between the hatch in the sloped ramp and the staging area should also be clear of any internal supports.

Figure 2:
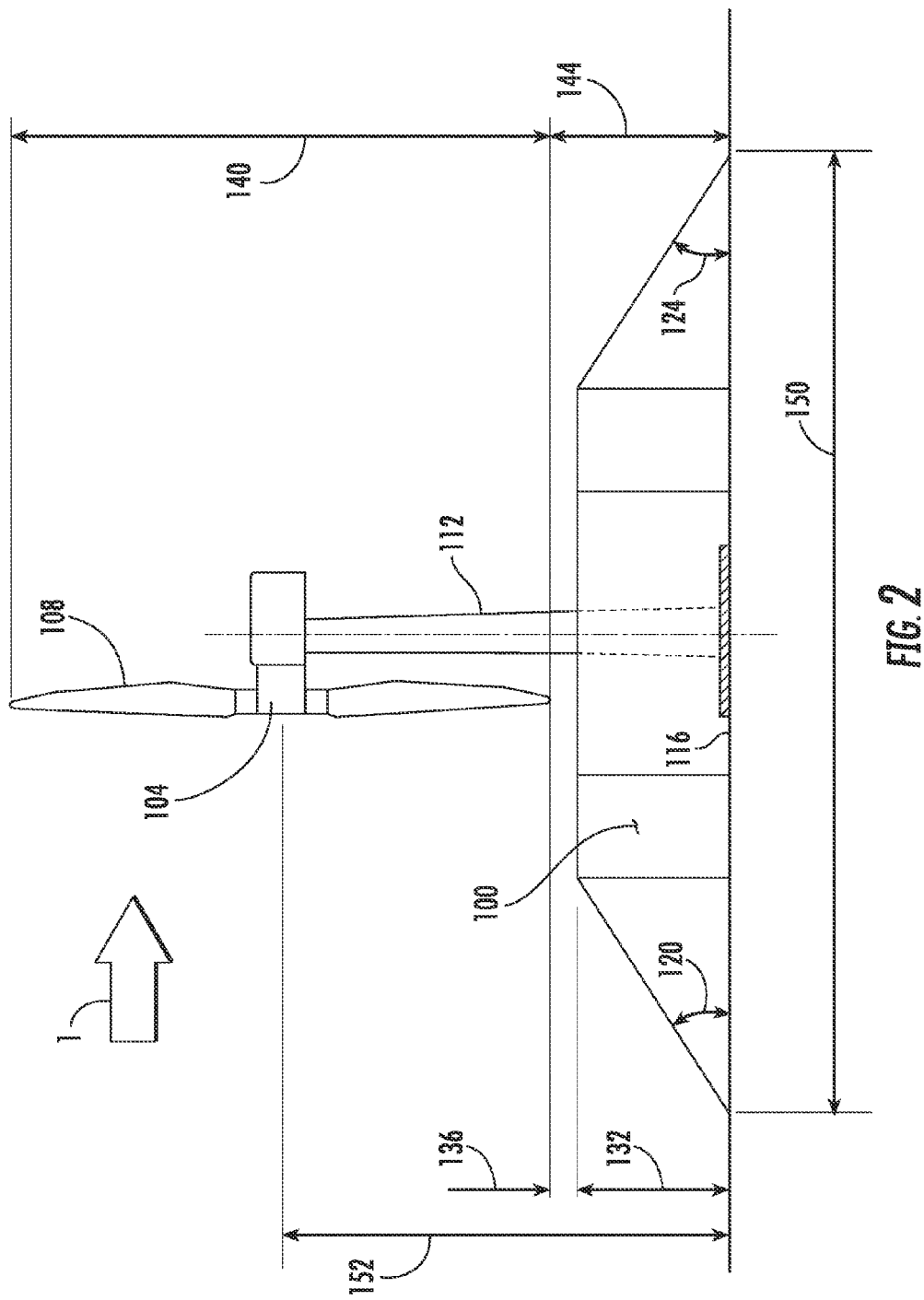
FIG. 2 is an exemplary side view of a wind diverter with a hexagonal cross section.

With regard to FIG. 2, this figure presents an exemplary side view of a wind diverter 100 with a polygon flat section. In this figure the polygon is a hexagon shape (not shown), as installed surrounding the support column 112 of an installed wind turbine. The wind diverter 100 is symmetric with regard to the support column 112, with half of the installation in front of the support column 112 and half of the installation to the rear of the support column 112. This design enables the wind diverter 100 to provide efficient delivery of accelerated wind 1 to the blades of the rotor 108 for installations in which the rotor 108 is fixed, and in which the rotor 108 is emplaced upon a movable mount. As the rotor is moved, the wind diverter 100 continues to accelerate available wind 1 up to the rotor blades so as to derive the maximum efficiency from the action of the wind 1 against the rotor 108.

Figure 3:
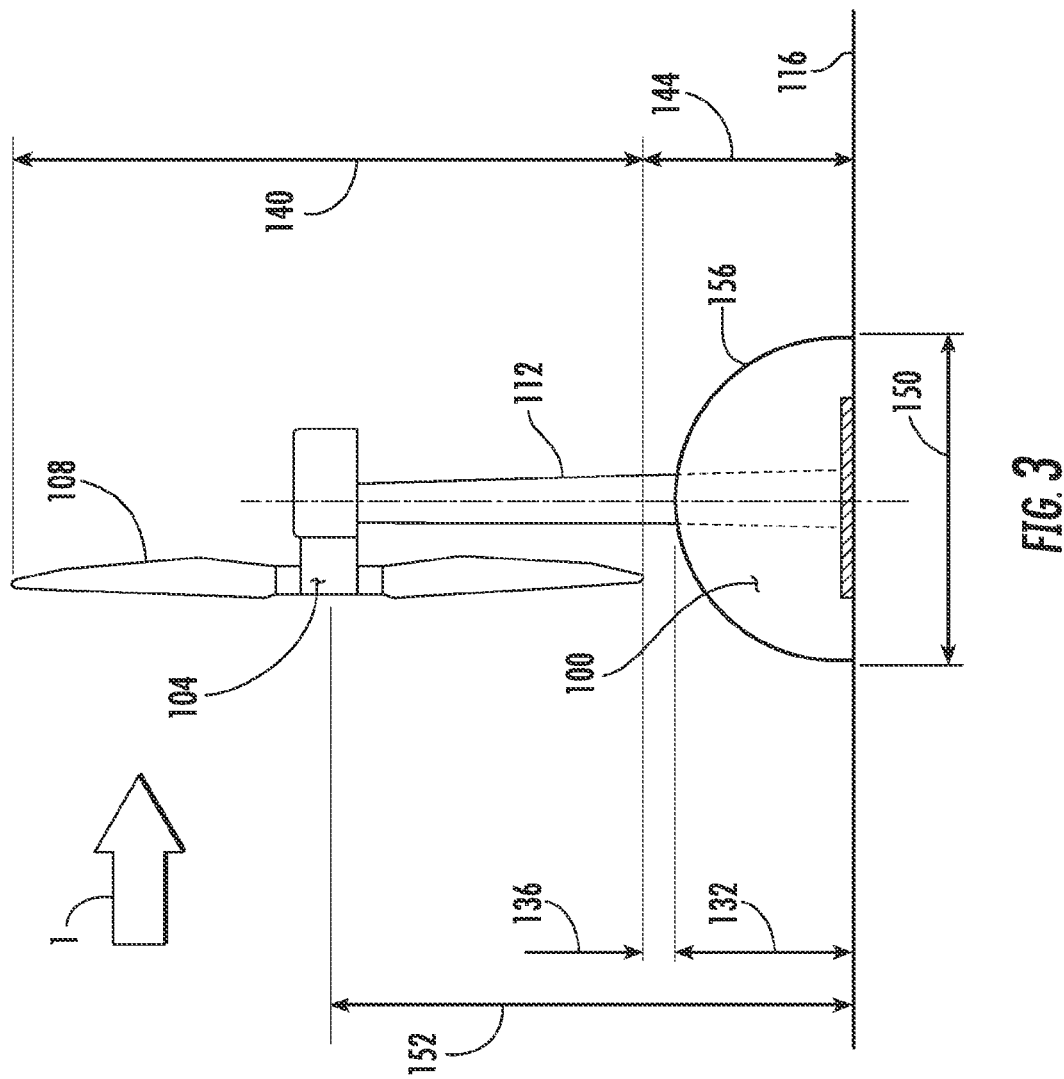
FIG. 3 is an exemplary side view of a wind diverter with a hemispherical cross section.

With regard to FIG. 3, this figure presents an exemplary side view of a wind diverter 100 in which the acceleration ramp of the wind diverter 100 is configured as a half sphere or hemisphere 156. In computational studies, a true hemisphere was found to be a less effective shape at directing the airflow upward. The principle advantage of the hemispherical design is that it will take up the least amount space around the wind turbine support column 112.

In this exemplary embodiment, the hemispherical wind diverter 156 is constructed such that the bottom of the hemisphere is at ground level 116 and the top of the hemisphere extends upward to a clearance distance 136 from the bottom of the rotor blade arc. The clearance 136 is calculated such that the bottom of the rotor blades will not come into contact with the wind diverter 100, but also provides a safety margin to allow for sag or mechanical strain that might cause the rotor blades to drop below their initial installation height. The ramp height 132 of the wind diverter 100 will be specific to each individual wind turbine installation. However, a hemispherical wind diverter 156 may be constructed with a flattened top to increase the laminar flow as the accelerated wind is delivered to the rotor blades, thus improving the efficiency of a hemispherical wind diverter 156.

For large wind turbine installations, one possible method of building the hemispherical wind diverter 156 would be a tensioned fabric type structure. This type of construction would consist of fabric such as canvas, sailcloth, fiberglass, or light weight plastic sheeting stretched over wires which are formed through arcs and secured at either end into the ground 116 around the wind turbine installation. The hemisphere may also be constructed in a pre-fabricated fashion, taking into account computations to account for terrain features of the installation site. Around the support column 112 for the turbine 104, depending on turbine 104 size, it may be possible to use a ring to keep the support wires independent of the support column 112 in either the custom or pre-fabricated installation.

If permitted by the wind turbine supplier, it may be possible to connect the wires directly to the main wind turbine support column 112 as part of a custom installation of the hemispherical wind diverter 156. However, a careful check of the effect that the additional loading would have on the support column 112 and its foundation would need to first be undertaken to be certain that they could withstand the added loads. The advantage of this type of construction is that it could be easily disassembled, particularly for the half of the wind diverter that may require disassembly for future maintenance on the bearings or rotor 108.

Figure 4:
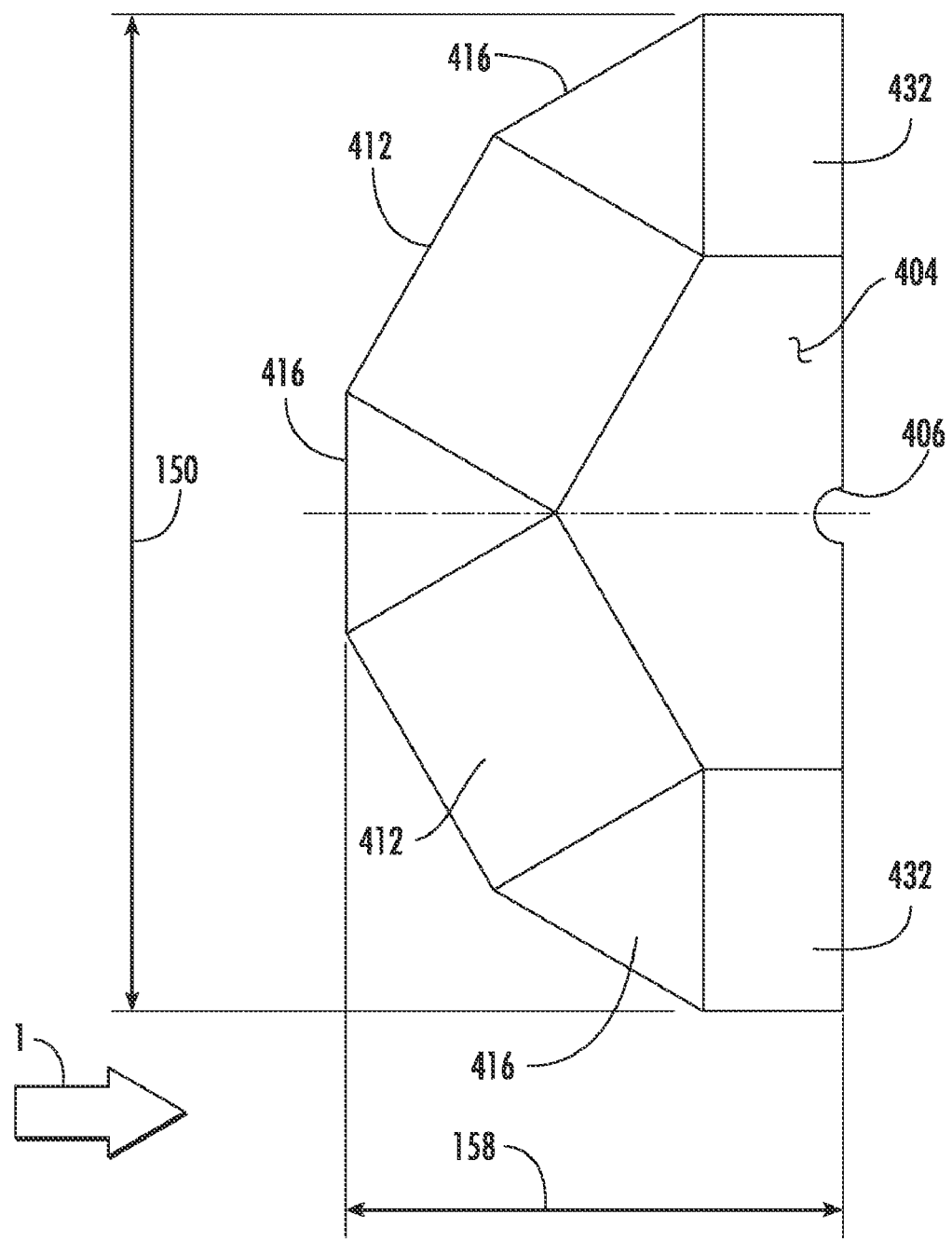
FIG. 4 is an exemplary top view of a one-half wind diverter arrangement with a hexagonal cross section as separate from a wind turbine.

With regard to FIG. 4, this figure presents a top view of the front half of wind diverter 100 with a hexagonal flat panel 404. The hexagonal flat panel 404 is the portion of the wind diverter 100 that is positioned below the arc of the rotor blades with a clearance 136 sufficient to keep the rotor blades from impacting the hexagonal flat panel 404 of the wind diverter 100 and to account for any sag of the rotor 108 over time. The hexagonal flat panel 404 is supported by rectangular panels 412 that extend from the ground 116 to an edge of the hexagonal flat panel 404. A wind diverter with a complete hexagonal flat panel 404 would have a rectangular panel 412 connected to each edge of the hexagonal flat panel 404, however, a wind turbine with a fixed rotor 108 position may utilize a wind diverter that diverts wind from only the direction in front of the wind turbine, and thus may consist of only a half section of the hexagonal flat panel 404. In this configuration, the construction may employ half panels 432 at either side of the hexagonal flat panel 404 to complete the construction of the half wind diverter 100.

Closing the gaps between the full rectangular panels 412 and the half rectangular panels 432 are triangular panels 416. The construction of the wind diverter 100 with full rectangular panels 412, triangular panels 416, and half rectangular panels 432 provides a seamless diversion of wind 1 from the ground 116 level up to the level of the rotor blades to deliver wind 1 with increased velocity directly to the rotor blades with no loss of the wind due to gaps or missing panels in the wind diverter 100. In addition, the hexagonal flat panel 404 can have a cutout 406 in the middle of the flat panel as a cutout for the wind turbine support column 112 when the wind diverter 100 is installed.

The half wind diverter 100 would be located on the upwind side of the wind turbine and the length 158 from upwind to downwind would be approximately one-half of width 150. It would still be able to capture some of the additional wind from the non-predominant direction, even though the rotor itself is not able to swing into the direction of the wind. Also, for some wind turbine installations, budget constraints may restrict installation of a full wind diverter 100, at least initially. The second half of the wind diverter 100 could be installed later when the necessary funds become available. For half wind diverters 100 used in this scenario, the rotor 108 would be able to turn into the wind in order to take advantage of the wind from the non-predominant direction.

Figure 5:
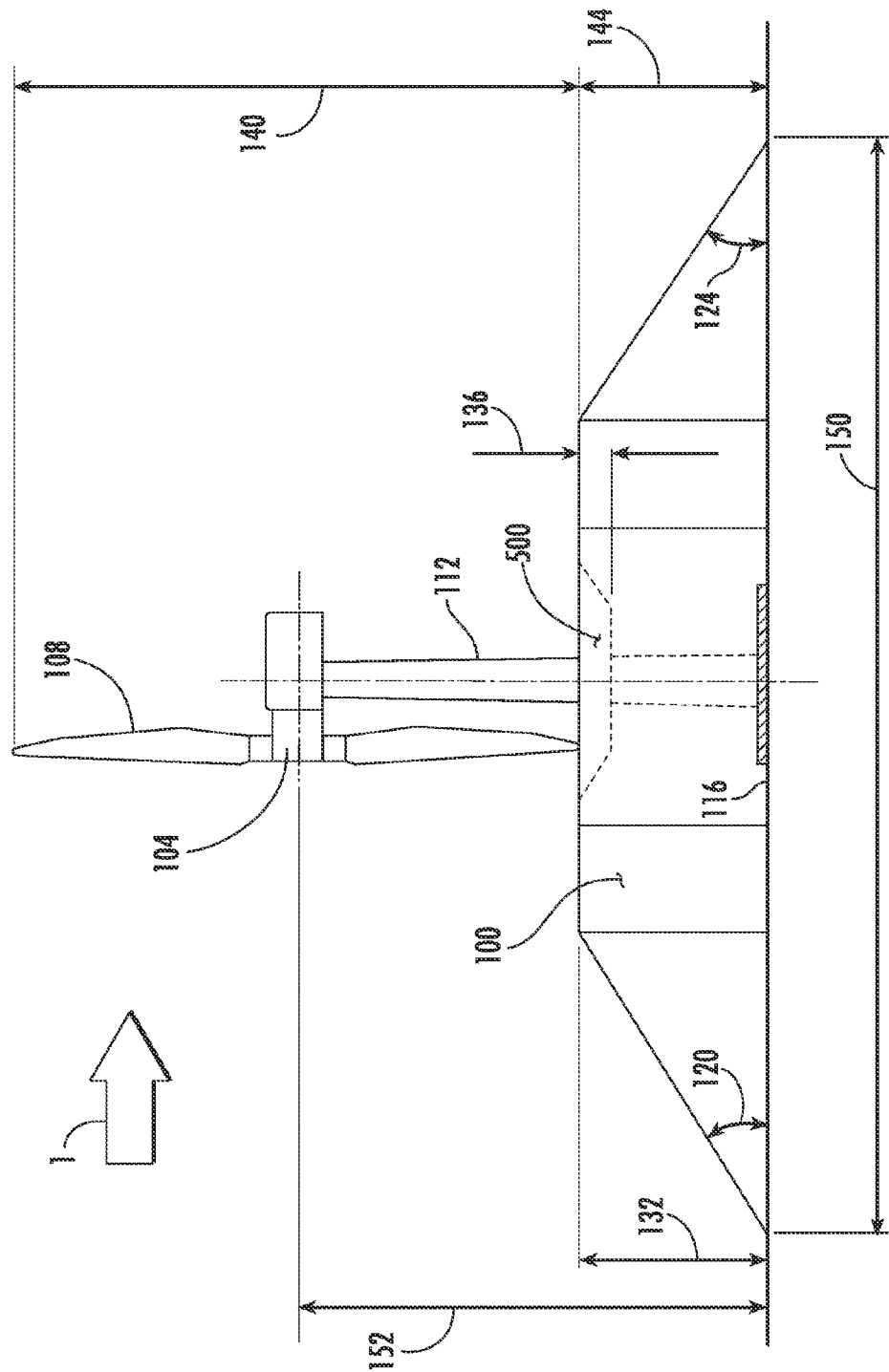
FIG. 5 is an exemplary side view of a wind diverter with a hexagonal cross section and a center pit depression in the center of the wind diverter.

Regarding FIG. 5, this figure presents the side view of a wind diverter 100 with a recessed portion as a center pit 500 depression in the center of the flat polygon surface panel of the wind diverter 100. The closer that the airstream can be lifted to the bottom of the rotor arc, the faster the airstream will be reaching the rotor 108. Some clearance is necessary under the rotor 108 in the event of its flexing or bending. However, this clearance is only necessary underneath the rotor 108. The outer edges of the top of the wind diverter 100 can be raised to the same elevation as the bottom of the rotor 108 increasing the amount of wind impacting the rotor 108. The central part of the flat panel top of the wind diverter 100 may be depressed below the level of the rotor blades, creating a pit 500 so as to provide sufficient clearance underneath the rotor 108. This center pit 500 embeds the necessary clearance 136 within the top of the wind diverter 100 allowing a more efficient delivery of the accelerated airstream to the rotor blades.

Figure 6:
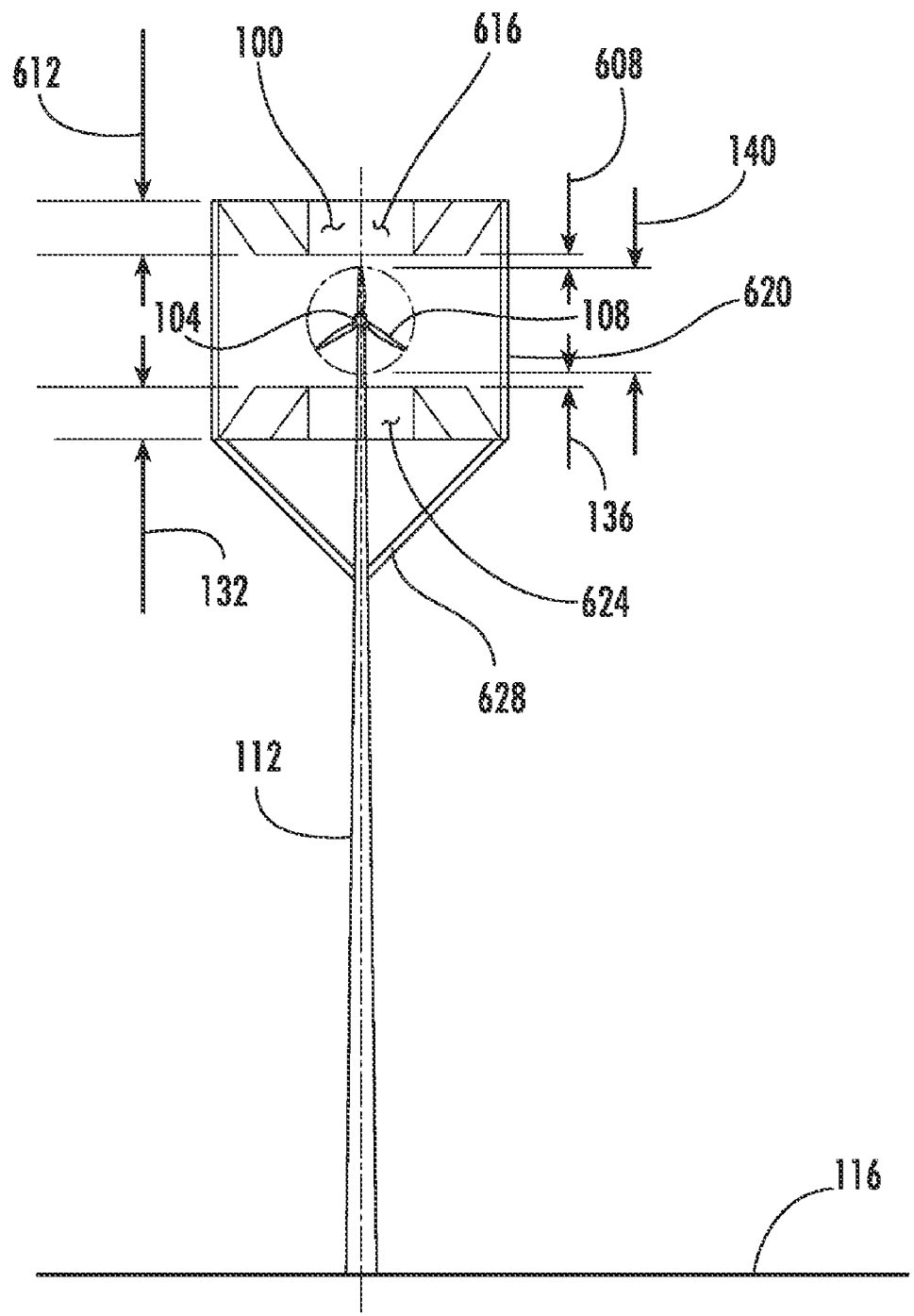
FIG. 6 is an exemplary front view of a wind diverter configured as a double wind diverter mounted upon the support column of the wind turbine.

Regarding FIG. 6, this figure presents an exemplary view of a wind diverter 100 configured for use in small wind turbine 104 applications. For smaller wind turbines 104, two (2) devices can be used with one (1) lower section wind diverter 624 located beneath the rotor 108 as in the standard design and an upper section wind diverter 616 located above the rotor 108. Both the upper section 616 and lower section 624 of the wind diverter 100 may be constructed in any shape in which a wind diverter 100 may be constructed for a larger wind turbine 104 installation. The lower and upper sections may be separated by pipe supports 620 or aerodynamically designed vane corner supports located on the outer edge of the wind diverter 100. In addition, the lower section 624 of the wind diverter may be supported by support struts 628 connected from the support column 112 of the wind turbine 104 to the bottom of the lower section 624. For very small turbines, a minimum of three (3) such pipe supports 620 or support struts 628 may prove sufficient. For larger turbines, multiple supports may be required. For smaller wind turbines, it may be possible to build the wind diverter 100 out of solid materials such as metal or PVC for added stability.

For very small turbines, it may be possible to support the upper section of the wind diverter 616 from the top of the housing. The upper section of the wind diverter 616 can be permanently fixed to the top of the housing and would turn as the rotor 108 turned. If permanently affixed, then only half of the wind diverter 100 would be needed, positioned in front of the rotor 108 in the wind direction. Another possible design would be to put a bearing on the top of the housing with another bearing on the bottom of the housing. The housing would turn around both of the bearings on the support column 112. The upper section of the wind diverter 616 would be permanently attached to the top of the support column 112. This design could necessitate changing the standard construction of the turbine housing by the turbine manufacturer to be fully realized. Consistent with the design for larger wind turbines 104, each portion of the wind diverter 100 would be emplaced within a calculated clearance distance 608, 136 from both the upper and lower tips of the rotor blades so as to maximize the amount of airstream delivered to the rotor blades.

In a pole mounted configuration, the upper section 616 and lower section 624 of the wind diverter 100 are mounted on a pole or support column 112. The lower section 624 is supported off of the pole or support column 112 with support struts 628 attached to the bottom of the lower section 624. The upper section 616 is supported by pipe supports 620 between the two (2) halves of the wind diverter 100. One advantage of this design is that the ramp height 612, 132 can be increased for both the lower 624 and upper 616 sections.

Figure 7:
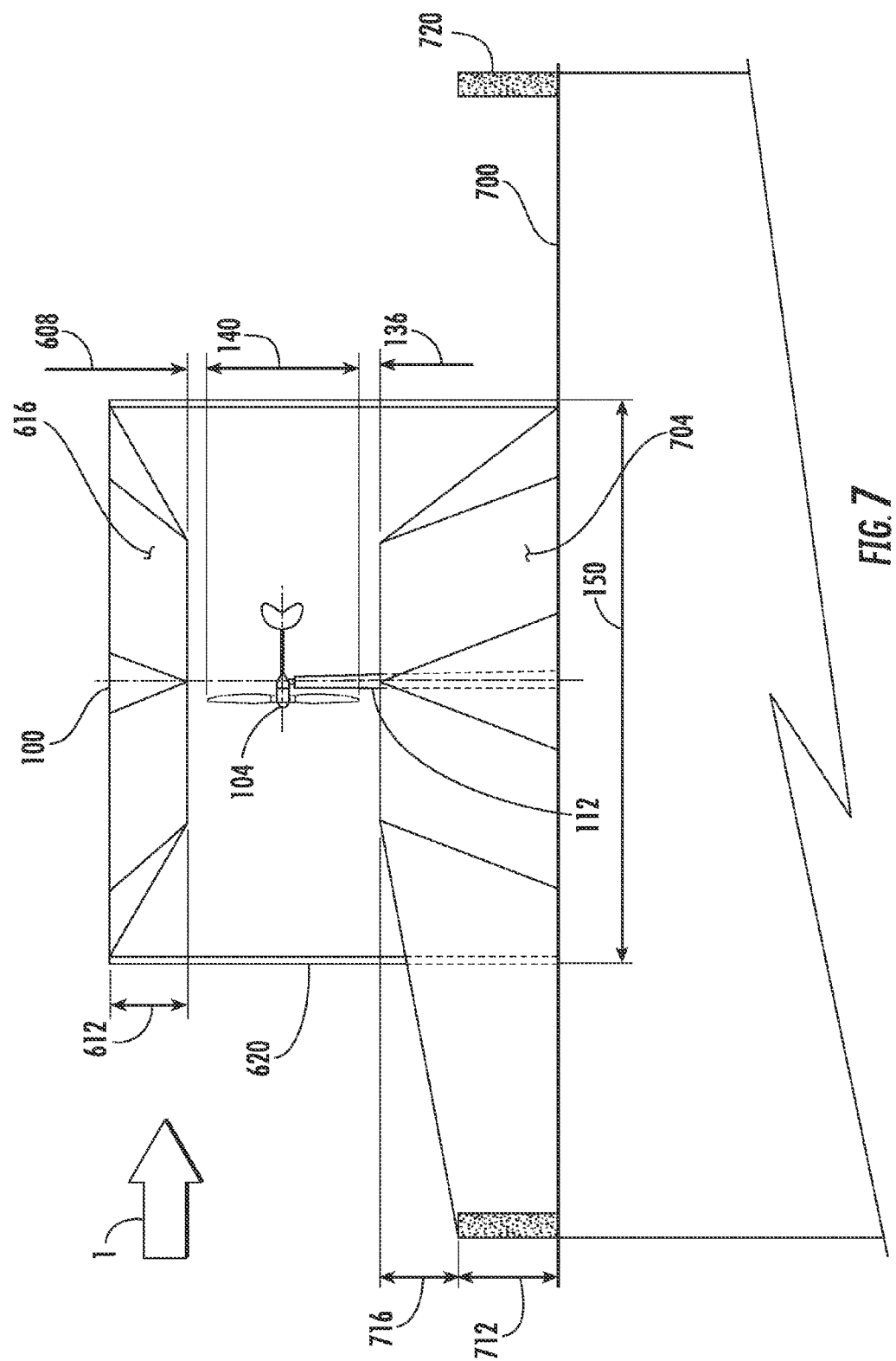
FIG. 7 is an exemplary side view of a roof mounted wind diverter with attachment to the berm of the building roof.

Regarding FIG. 7, a roof mounted wind diverter is presented in an exemplary embodiment of the wind diverter 100. In this configuration, the lower section 704 of the wind diverter 100 is located on the roof 700 of a building. The upper section 616 is supported either from the lower section 704 or from the roof 700. As in a ground based installation, see FIG. 1, the wind diverter 100 mounted on a roof top may consist of any design shape consistent with the roof installation.

As in the standard wind diverter 100 design, the lower section 704 will extend from the top of the roof to the bottom of the rotor 108, less clearance 136. The rotor height will need to be above the parapet or berm 720 that surrounds the roof top. The lower section 704 will also need to clear the height of the parapet 720. The height of the upper section 616 can also be adjusted to maximize the amount of wind that is redirected to the rotor 108. In general, the upper section 616 will be shorter than the lower section 704.

It may be possible to connect the leading edge of the wind diverter 100 to the roof parapet 720. This will help to reduce some of the turbulence after the airstream rises up the building face and then clears the parapet. The berm height 712 of the parapet may be incorporated into the design of the ramp portion of the lower section 704, thus contributing to the ramp height 716 and more fully integrating the roof parapet into the wind diverter 100 for greater integrity and stability for the lower section 704 of the wind diverter. The wind diverter 100 can be designed to take advantage of the Coanda effect to convert the turbulent flow over the building roof into a more laminar flow. It is also envisioned that in a corner position, the leading edge of the wind diverter 100 may be connected to the roof parapet 720 on two sides or possibly three or four sides depending on rooftop configuration.

Figure 8:
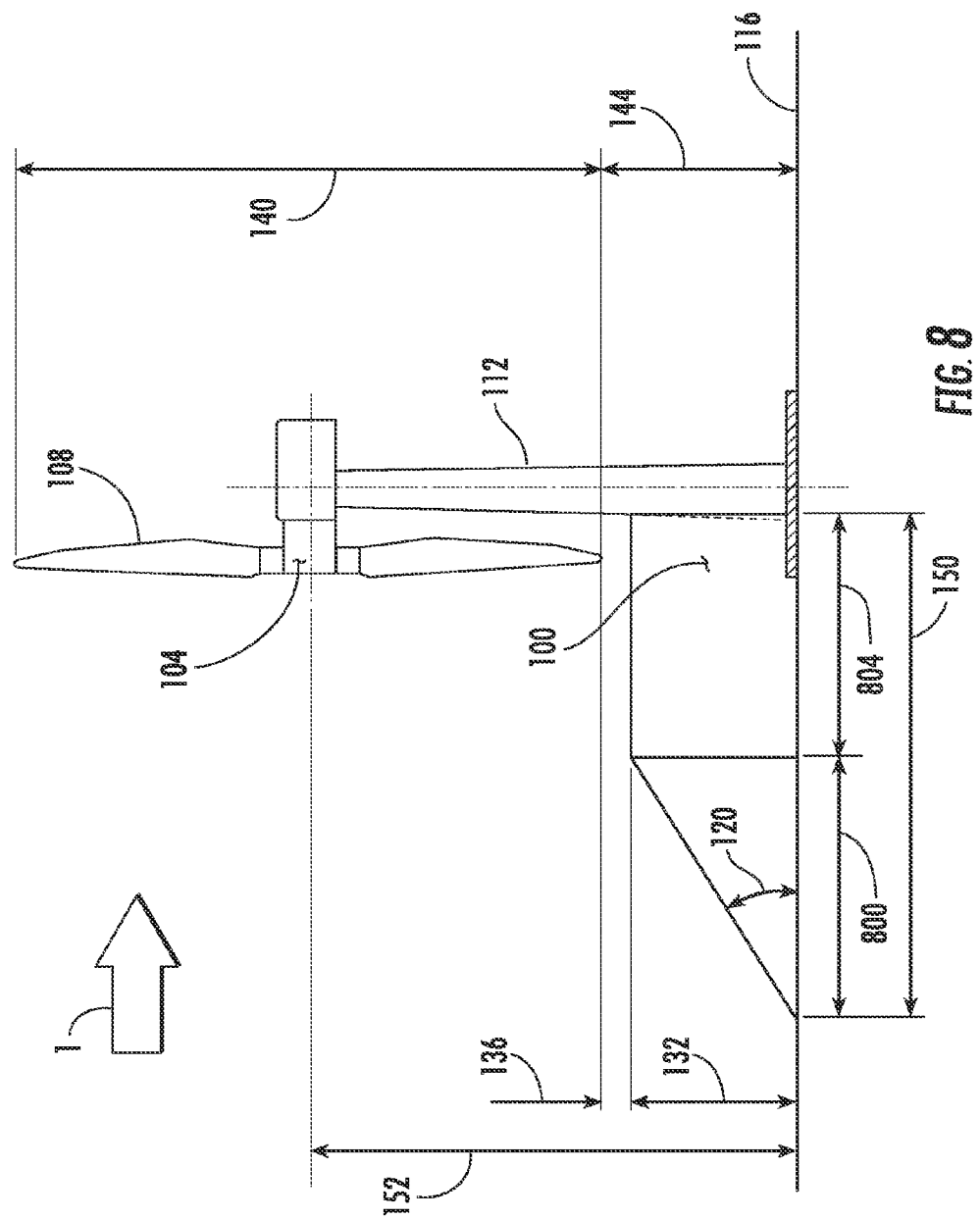
FIG. 8 is an exemplary side view of a wind diverter configured as a ramp with a flat top proximate to the wind turbine.

Regarding FIG. 8, this figure presents an exemplary side view of a wind diverter configured as a ramp with a flat top proximate to the wind turbine (in a one half configuration), such as could be used with a static turbine configuration. As in the wind diverter 100 having a flat top that is hexagonal in shape, the rectangular flat top 804 is at a height determined as a function of the distance from the ground to the bottom of the rotor arc, less the clearance distance 136 as previously defined. The ramp 800 extends from the leading edge of the rectangular flat top 804 down to ground level 116 at an angle 120 that is a function of the installation site. A typical angle for the ramp angle 120 for greatest efficiency in concentrating and accelerating the wind 1 flow to the rotor blades may be between 15 and 75 degrees, with a common ramp angle 120 of about 30 degrees if the installation site will allow for this ramp angle 120. In another embodiment, flat top 804 may extend past support column 112 in the downstream direction. Additionally, the ramp may have an airfoil design or "S" shape 1400, such as in FIG. 14. Furthermore, to help direct the wind and prevent cross currents in a fixed or static turbine situation, walls could be installed on the sides of the angled ramp.

Figure 9:
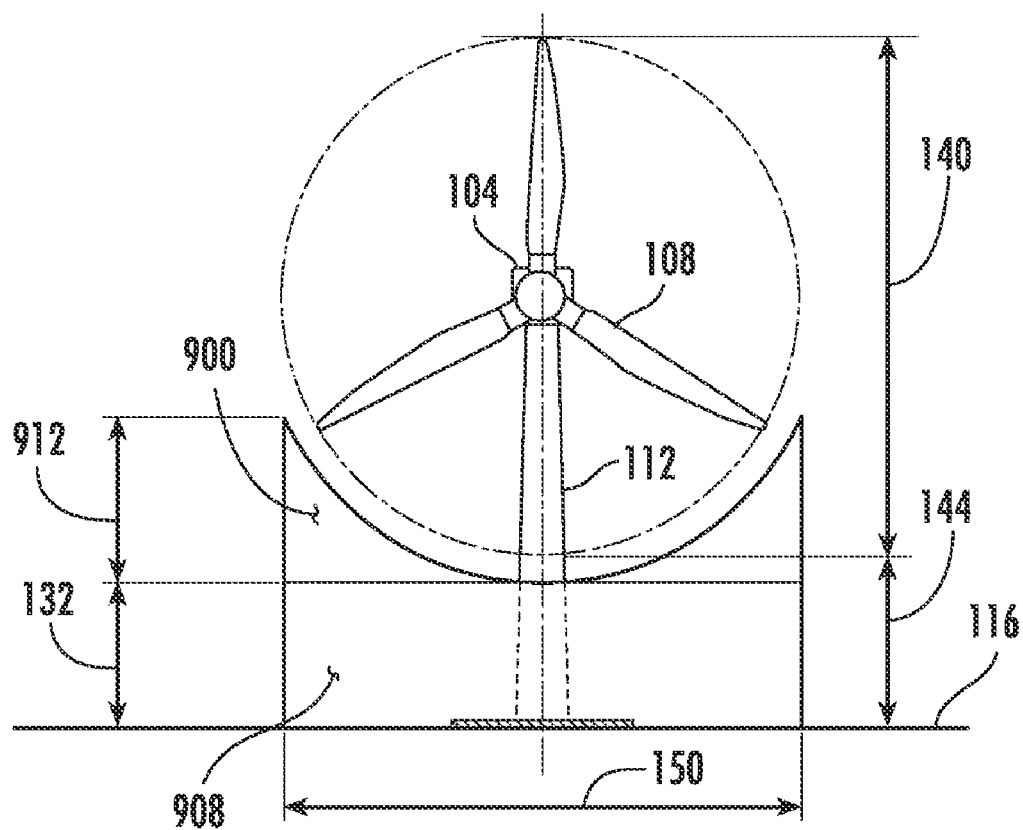
FIG. 9 is an exemplary front view of a wind diverter configured as a ramp with a flat top and rotor blade chute.

Regarding FIG. 9, this figure presents a front view of an exemplary wind diverter 100 having a rectangular cross section as described above (see FIG. 8) but with the addition of wind chutes 900 to increase the focus and the laminar flow of the airstream being delivered by the wind diverter 100, such as could be used with a static turbine configuration. To further concentrate the wind going to the rotor 108, chutes could be added on the top surface of the ramp design. Various designs of chutes 900 can be incorporated including low, medium and high chute heights, as well as a chute that rises to the top of the rotor arc.

In an exemplary design with a low height chute, the chute height 912 is the same as the bottom elevation of the rotor arc. For a design incorporating a medium height chute, the chute rises as high as the outer diameter of the rotor arc. For a design incorporating a high chute, the chute rises as high as the hub height 152 or centerline of the rotor. A chute height 912 that accomplishes the greatest efficiency is the top of rotor arc chute wherein the chute rises to the top of the rotor arc and provides a near encirclement of the rotor 108. The chute throat, which represents the opening through which the chute 900 funnels the airstream delivered by the ramp, can be made wider than rotor diameter to capture more of the incoming wind and concentrate it upon the rotor blades.

Additionally, rather than building a straight chute 900, the walls of the chute 900 could be curved to create a partial Venturi effect. This beneficial effect might be more pronounced for chute heights 912 that reach the centerline or the top of the rotor 108. In a typical installation, higher chutes 900 are emplaced on larger wind turbines for greater stability for the chute 900 and to increase the efficiency of the airstream for the wind turbine 104.

Figure 10:
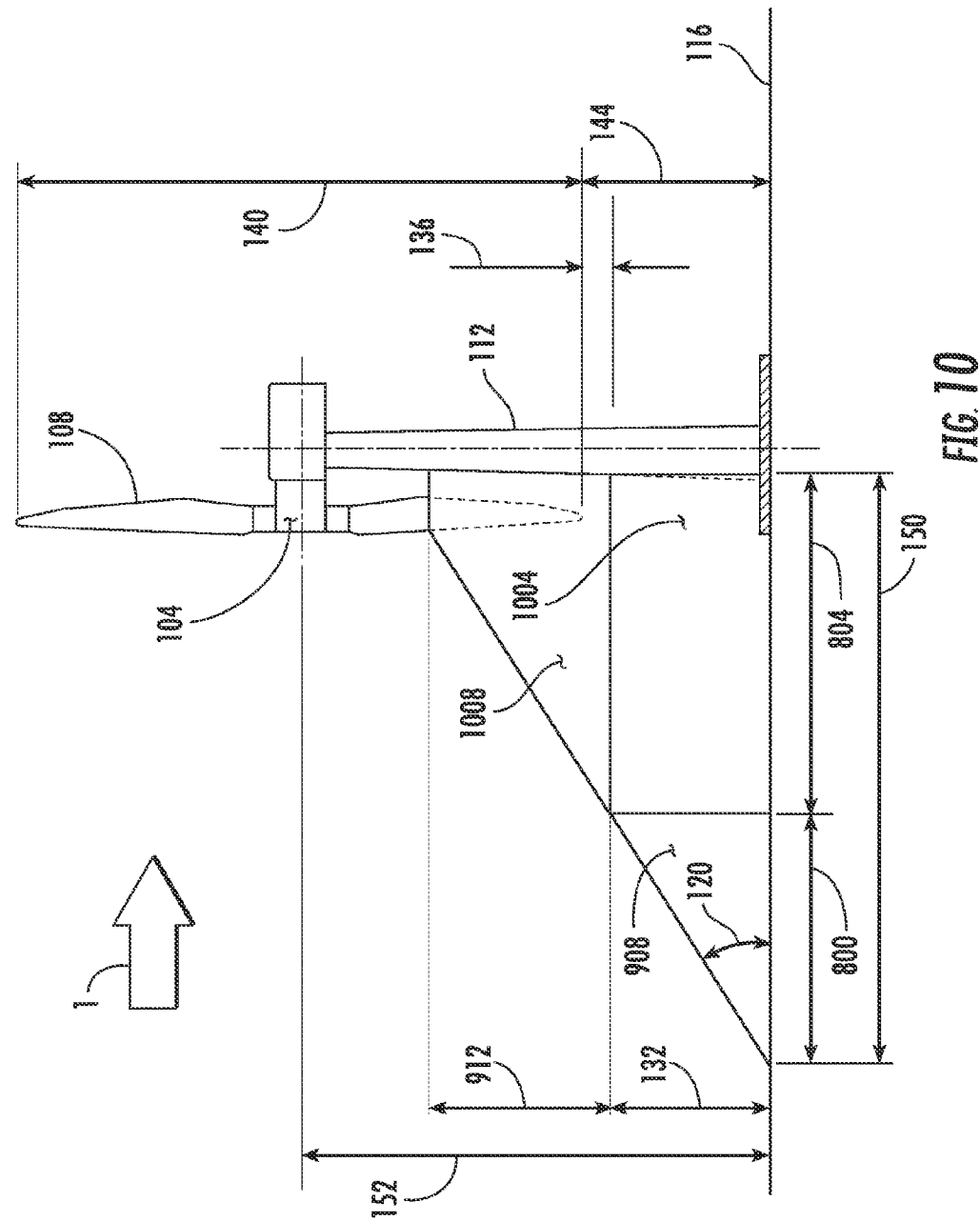
FIG. 10 is an exemplary side view of a wind diverter configured as a ramp with a flat top and continuing rotor blade chute.

Regarding FIG. 10, this figure presents an exemplary side view of a wind turbine 104 with a medium height chute 1008, such as could be used with a static turbine configuration. As shown in the figure, the chute 1008 is integrated as a seamless continuation of the ramp 908 portion of the wind diverter 100. This integration serves to funnel the airstream diverted by the ramp 908 directly to the bottom of the rotor blades and concentrates the airstream on the area of the rotor blade arc that is encircled by the chute 1008. The wind diverter 100 in this exemplary view has a flat section 1004 as well as a ramp 908 to serve as a floor for the chute 1008, increasing the laminar flow, and increasing the efficient transfer of energy from the airstream to the rotor blades. Other chute 900 heights may be used in other wind turbine installations as design dictates for the greatest efficiency in the delivery of the airstream to the wind turbine rotor 108.

Figure 11:
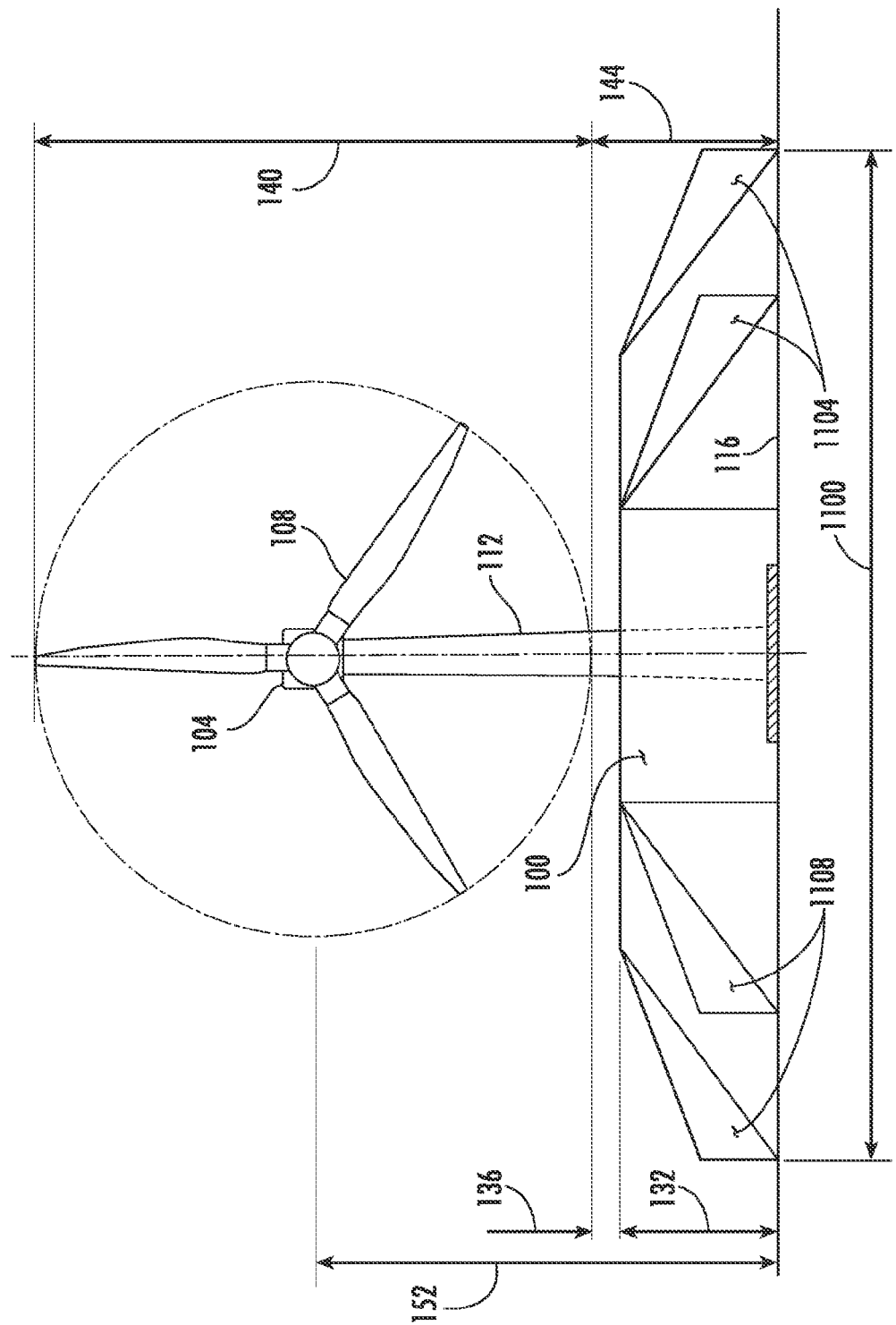
FIG. 11 is an exemplary side view of a wind diverter with a hexagonal cross section, with wind directing vanes attached to joint portions of the wind diverter sections.

Regarding FIG. 11, this figure presents an exemplary view of a wind diverter 100 with the incorporation of spill vanes (1104, 1108). For wind diverters 100 with polygon shaped top surfaces and construction, when the wind is approaching at angle other than in-line or perpendicular to one of the rectangular panels of the wind diverter 100, there is the possibility of side slippage of the airstream around the wind diverter 100. This can be partially prevented by adding spill vanes 1104, 1108 on the ramp portion of the wind diverter 100.

The spill vanes 1104, 1108 can be designed to be either permanently fixed or to be movable. It would be possible to design the spill vanes 1104, 1108 to be raised and lowered depending on the prevailing wind direction. Raising and lowering the spill vanes 1104, 1108 could be accomplished by a cable and pulley system or by a pneumatic system. Computer controls for the wind turbine 104 yaw mechanism responsible for changing the direction the turbine faces as the wind direction changes, could also be used simultaneously to raise and lower the spill vanes 1104, 1108 as needed to maintain the highest possible efficiency of airstream delivery to the rotor blades.

Figure 12:
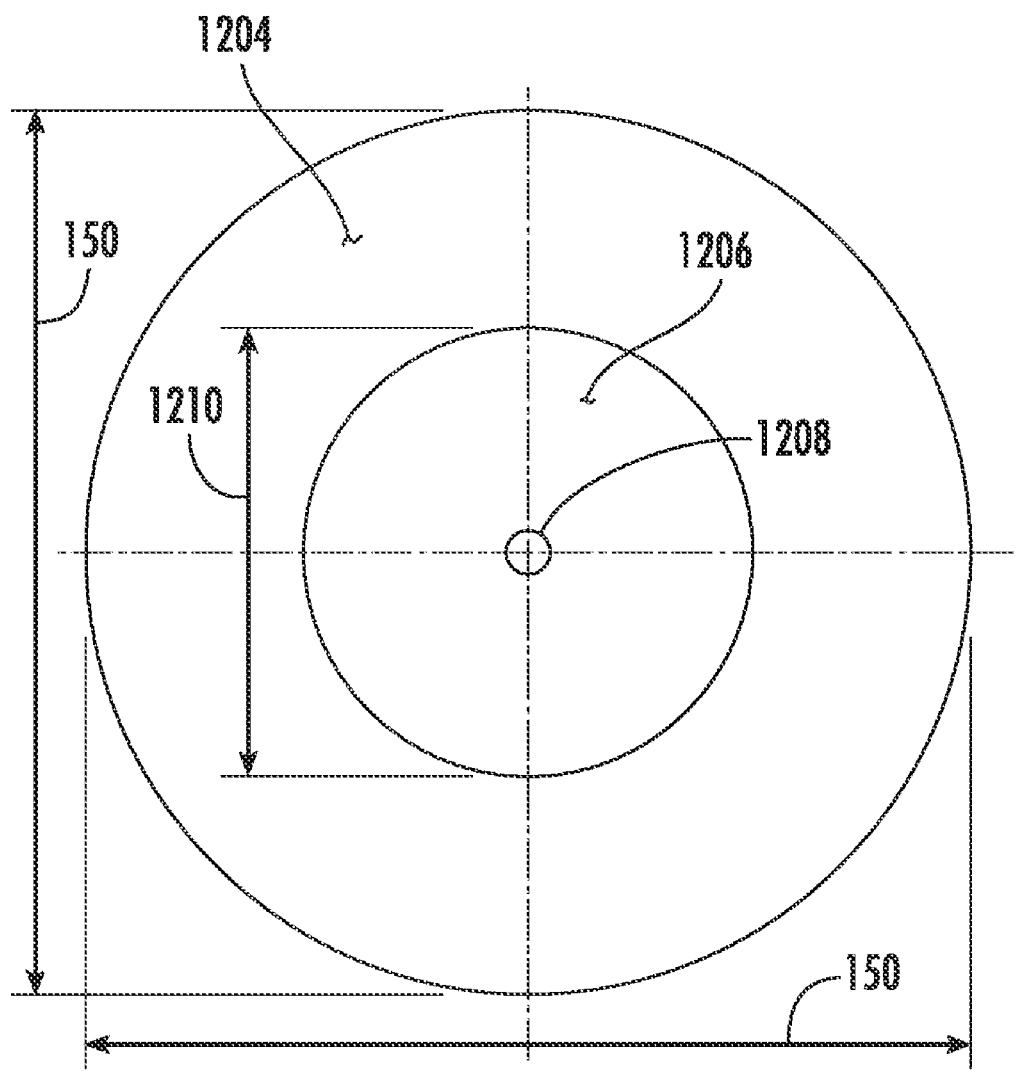
FIG. 12 is an exemplary top view of a wind diverter with a conical cross section as separate from a wind turbine.
Figure 13:
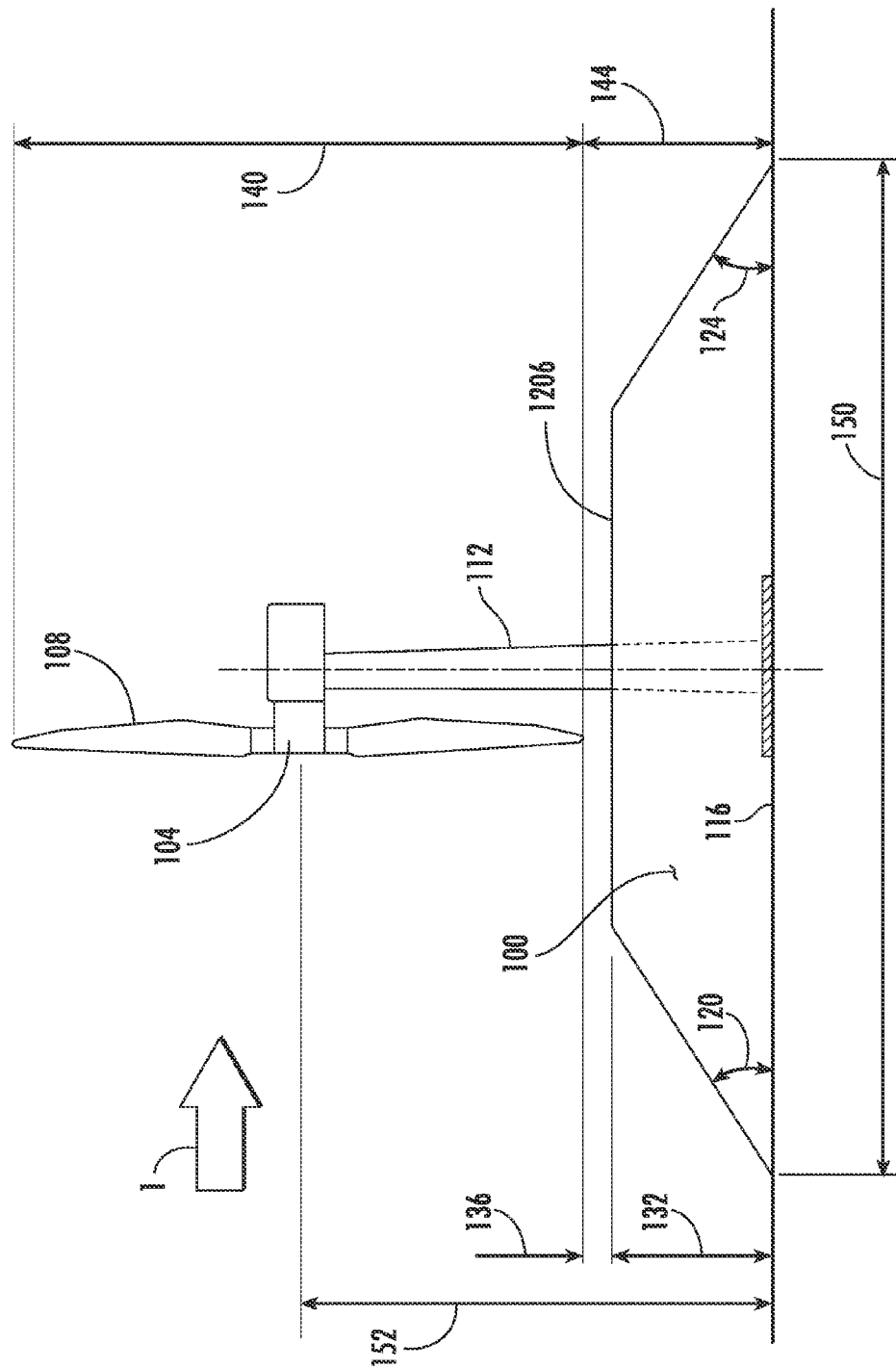
FIG. 13 is an exemplary side view of a wind diverter with a conical cross section.

Regarding FIG. 12 and FIG. 13, these figures present exemplary top and side views of a wind diverter 100 that may consist of a conical shaped ramp with a flat top for delivery of the airstream to the rotor blades. This wind diverter shares many of the same components and is manufactured from similar materials as the hexagonal wind diverter 100 (see description for FIG. 2). The conical sloped section 1204 extends from the ground 116 level of the installation site up at an angle formed between the ground and the surface of the conical sloped section 1204, and is connected with a joint all along the circumference of the circular flat section 1206 so as to form a truncated cone with a ramp height 132 that is measured as the height from the ground 116 to the bottom of the rotor 108 less a pre-calculated clearance distance 136. The flat section width 1210 for maximum efficiency should be approximately the same diameter width as the rotor 108 blades. For smaller turbines, the width of the flat circular section 1206 may be as large as 2 times the diameter of the rotor 108 blades and for larger turbines, the width of the flat circular section 1206 may be as large as 1.1 to 1.3 times the diameter of the rotor 108 blades. The ramp width 150 may be any diameter consistent with the terrain and circumstances of the installation site, but must be a function of the angle of the sloped section 1204 and the diameter of the flat section 1206 of the conical shaped wind diverter 100. In a full installation, the conical wind diverter 100 may be of sufficient size to encircle the wind turbine 104 installation with a center hole 1208 in the center of the circular flat section 1206 of sufficient diameter to accommodate the wind turbine support column 112. For wind turbine installations that are fixed in position, the conical shaped wind diverter 100 may be installed as a half section installed so as to divert the air stream up to the fixed rotor 108 position of the wind turbine 104. A half-conic section has the added advantage of possibly being less expensive to manufacture, install, and maintain, based upon the installation site terrain and features.

As in the wind diverter 100 having a flat top that is hexagonal in shape, the circular flat top 1206 of the conical wind diverter 100 is at a height determined as a function of the distance from the ground to the bottom of the rotor arc, less the clearance distance 136 as previously defined. The ramp 1204 extends from the leading edge of the circular flat top 1206 down to ground level 116 at an angle that is a function of the installation site. A typical angle for the ramp angle 120 for greatest efficiency in concentrating and accelerating the wind 1 flow to the rotor blades may be between 15 and 75 degrees, with a common ramp angle 120 of about 30 degrees if the installation site will allow for this ramp angle 120.

Figure 14:
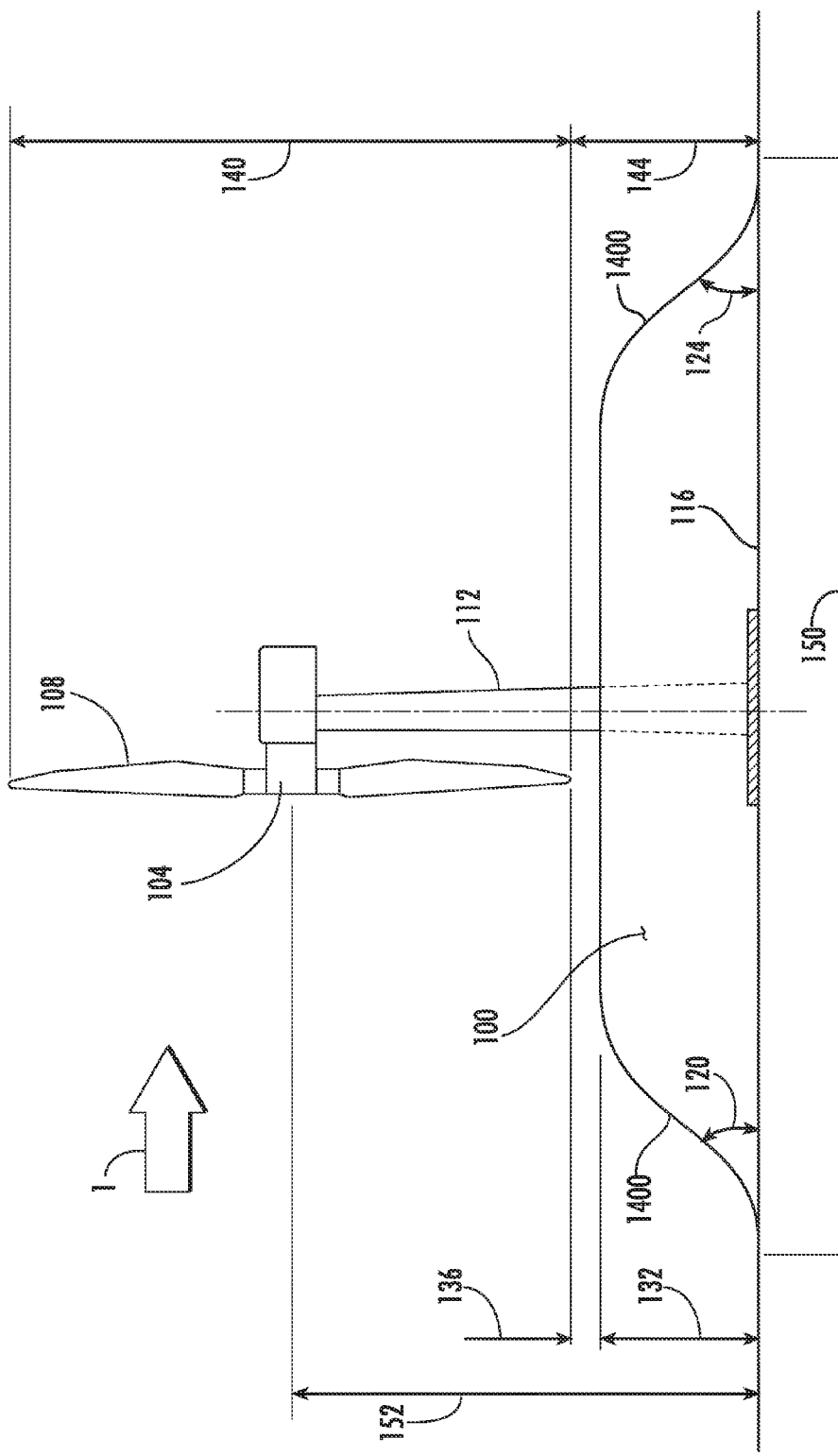
FIG. 14 is an exemplary side view of a wind diverter with ramps having an airfoil design or "S" shape.

Regarding FIG. 14, this figure presents an exemplary side view of a wind diverter 100 with ramps having an airfoil design or "S" shape 1400, as described above.

Figure 15:
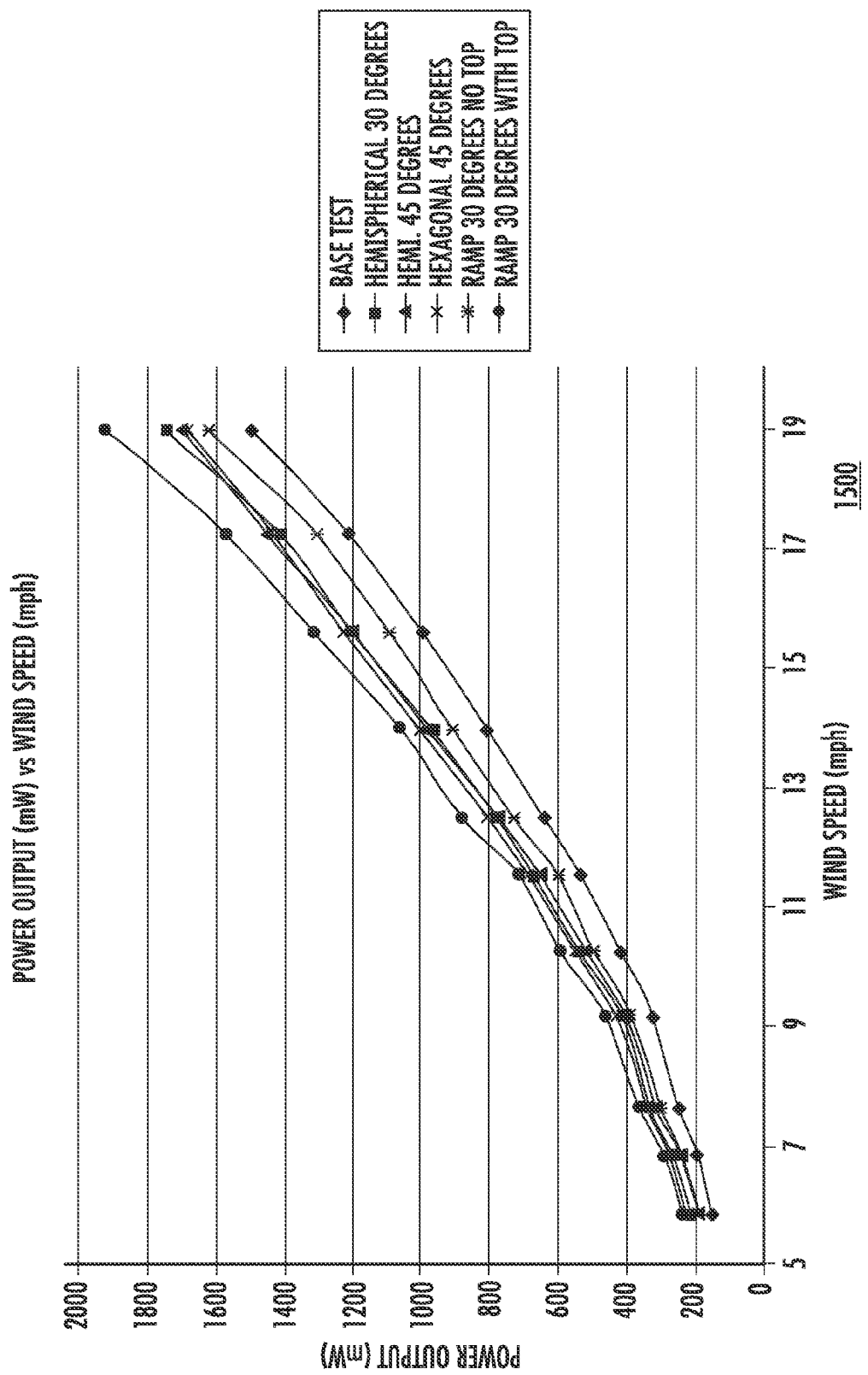
FIG. 15 is a view of a chart representing the change in power output vs. wind speed for a plurality of wind diverter tests.

Regarding FIG. 15, this figure presents test results 1500 for a wind turbine scale model with wind diverters 100 of various shapes and configurations built to the scale of the wind turbine and installed on the wind turbine. The tests were conducted in a wind tunnel with the ability to control both the speed and flow of wind through the wind tunnel with a high degree of accuracy. The wind tunnel also contained measurement and processing power sufficient to capture the speed and configuration of the airstream at all points along the tunnel including the portion in which the wind turbine scale model and attached wind diverter 100 scale model were installed.

As shown in the legend associated with the test results 1500, six separate tests were conducted. A base test of the wind flow around the wind turbine without a wind diverter 100 attached was conducted to provide the basis for comparison with later tests once the wind diverter 100 was attached. The base test conducted demonstrated that at the lowest speed that could be produced by the wind tunnel, approximately 6 MPH, the power output for the wind turbine scale model was approximately 180 milliwatts (mW). The maximum speed for the velocity of wind tested was approximately 19 MPH. At this wind speed, the power output for the wind turbine scale model was approximately 1500 mW. This curve for various wind speed settings is presented in the figure as the bottom line in accordance with the legend associated with the test results 1500.

Various configurations of the wind diverter 100 were constructed and attached to the wind turbine in the wind tunnel. These configurations represent a portion of the shapes and configurations that are possible with the wind diverter 100 as described above and comprised the group of a hemispherical wind diverter with a 30 degree slope (see FIG. 3), a hemispherical wind diverter with a 45 degree slope (see FIG. 3), a wind diverter with a flat top portion in a hexagonal shape (see FIG. 1 and FIG. 4) and a 45 degree ramp angle, a simple ramp with no top and a 30 degree ramp angle, and a simple ramp with a rectangular flat top (see FIG. 8) and a 30 degree ramp angle. As may be appreciated by the results chart 1500, the addition of the wind diverter 100, regardless of configuration, increased both the wind speed delivered to the wind turbine and the resultant power output from the wind turbine. As shown in the results, the most efficient and highest output of power of those wind diverter 100 configurations tested was for the simple ramp with a rectangular flat top and a ramp angle of 30 degrees. In this configuration the tested increase of power generation for the top wind speed of 19 MPH generated by the wind tunnel exceeded 26%.

No tests were conducted with wind diverters that were configured with spill vanes 1104, 1108, chutes 1008, or a central pit in the flat top surface 500. However, these configurations may be considered to provide even greater increases in power generation and wind flow efficiency through their ability to reduce turbulence, increase laminar flow, and deliver the airstream in a more focused manner to the rotor blades of the wind turbine 104.

Figure 16:
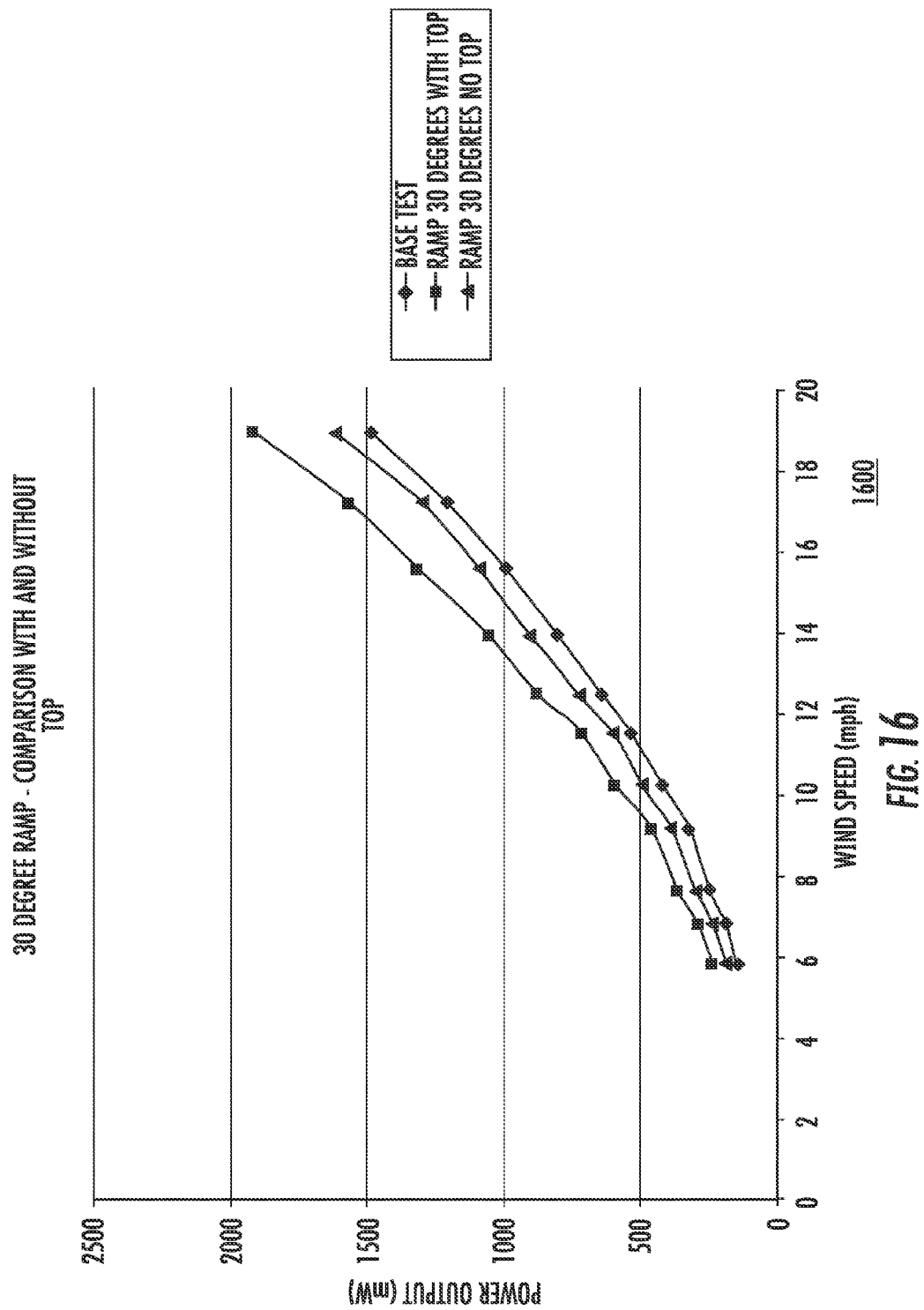
FIG. 16 is a view of a chart representing a comparison of the wind speed change for a wind diverter with and without a flat top connected to the diverter ramp.

Regarding FIG. 16, this figure presents test results 1600 for a wind turbine scale model with wind diverters 100 having a 30 degree ramp slope, with and without a flat top attached to the ramp, built to the scale of the wind turbine, and installed on the wind turbine. The test results 1600 represent an exemplary subset of the wind diverter 100 configurations and present the results showing the concentration of the air flow for a particular wind speed such that the concentrated air flow is capable of producing increased energy output, in the form of power, for a given wind speed.

The test results 1600 graph a base test, wherein there is no wind diverter 100 attached to the wind turbine 104, for a series of controlled wind velocities. It can be seen in the test results 1600 that for the base test at a minimum start-up speed of approximately 6 MPH, the unaugmented wind turbine 104 delivered energy equivalent to a power output (in milliwatts) of approximately 200 mW. At a full speed test of 19 MPH, the unaugmented wind turbine 104 delivered energy equivalent to a power output of approximately 1500 mW.

The second series of tests was performed with a wind diverter 100 attached to the wind turbine 104 comprising only the ramp portion of the wind diverter 100 (i.e., no top present), with a ramp angle of 30 degrees. As may be seen from the test results 1600, the wind diverter 100 with only a ramp increased the power output at a wind speed of 6 MPH, and also increased the power output of the wind turbine 104 at every speed tested.

The increase in power output of the wind turbine 104 is even more significant when the ramp of the wind diverter 100 is connected to a flat top that extends below the tips of the rotor blades as shown in the third series of tests. At a wind speed of only 6 MPH, the wind diverter 100 with a 30 degree ramp and a flat top increased the power output of the wind turbine 104 by approximately 26%, from approximately 200 mW to over 250 mW. The wind diverter 100 in this configuration also increased the power output at every wind speed tested over the base test, and also increased the power output for the wind diverter 100 configured only as a ramp with a 30 degree slope (i.e., with no top). The power output at the maximum wind speed tested, 19 MPH, was measured at approximately 1950 mW, as opposed to 1500 mW for the base test, and approximately 1600 mW for the test with a wind diverter 100 comprising a 30 degree ramp alone. The results 1600 thus show that significant energy increases may be achieved for every wind speed by attaching a wind diverter 100 composed of a sloped ramp connected to a flat top that extends under the bottom tips of the rotor blades of the wind turbine 104.

Regarding FIG. 17, this figure presents test results 1700 in the wind tunnel testing that was conducted, the increase in wind speed resulted in an increase in the wind turbine rotor speed as measured in RPM (Revolutions Per Minute). The results 1700 present tests for a plurality of wind diverter 100 configurations, however, the results 1700 do not represent an exhaustive test of every possible wind diverter 100 configuration. The wind diverter 100 configurations presented in these results 1700 represent a base test (no wind diverter 100), a hemisphere with a radius of 30 degrees, a hemisphere with a radius of 45 degrees, a hexagonal flat top configuration with a ramp slope of 45 degrees, a rectangular top with a ramp slope of 30 degrees, and a ramp with a slope of 30 degrees with no flat top attached to the ramp.

As seen in the graphed results 1700 of RPM vs. Applied Wind Speed, the attachment of a wind diverter 100 to the wind turbine 104 increased the turbine RPM in every configuration for each measured wind speed. In the 30 degree ramp slope connected with a flat top, as an example, the turbine RPM for the maximum wind speed of 19 MPH increased to over 700 RPM in comparison with approximately 620 RPM for the base configuration at the same speed. The increase in the focus of the air flow directly upon the rotor blades, as well as the increase in the laminar flow characteristic for the air stream, presented by the diverter accounted for a significant increase in turbine RPM, and resultant power output, for every air speed tested.

The foregoing detailed description of embodiments refers to the accompanying drawings, which illustrate specific embodiments of the invention. Other embodiments having different structures and operations do not depart from the scope of the present invention.

The term "the invention" is used with reference to certain specific examples of the many alternative aspects or embodiments of the applicants' invention set forth in this specification, and neither its use nor its absence is intended to limit the scope of the applicants' invention or the scope of the claims.

This specification is divided into sections for the convenience of the reader only. Headings should not be construed as limiting of the scope of the invention.

It will be understood that various details of the present invention may be changed without departing from the scope of the present invention. Furthermore, the foregoing description is for the purpose of illustration only, and not for the purpose of limitation, as the present invention is defined by the claims as set forth hereinafter.

What is claimed is:

1. An apparatus for delivering a focused airstream flow from an area surrounding a wind turbine to rotor blades of the wind turbine, the apparatus comprising:
    an at least partially removable frame comprising sections with high strength supports covered in light weight air resistant materials, the sections when installed comprising a permanent section of at least one half the total frame size and a remaining removable section;
    the frame comprising angled portions and a flat portion connected together such that the angled portions extend from a proximal end at an installation grade level and connect to the flat portion at a distal end of said angled portion;
    the flat portion of the frame being substantially horizontal and parallel with the installation grade level and having a width at least the same measurement as the rotor blade arc diameter of a wind turbine, wherein a shortest distance from a connection edge between the angled portion distal end and the flat portion to the rotor blades is at least one half of the rotor blade arc diameter;
    the flat portion of the frame being continuous from the connection edge to an edge adjacent a support column of the wind turbine and the flat portion being substantially the same elevation as the connection edge so as to provide a substantially unimpeded airstream flow surface from along the angled portion to along the flat portion;
    the flat portion of the frame when connected to the angled portion having a height equivalent to the bottom tip of the rotor arc of the wind turbine less a minimal clearance amount to avoid impacting the flat portion of the apparatus frame by the rotor blade;
    wherein the apparatus is installed in an at least partially removable manner at least partially encircling the support column of the wind turbine so as to concentrate an airstream on the front bottom portion of the wind turbine rotor blades.

2. The apparatus according to claim 1, wherein the frame high strength support members comprise high strength materials selected from the group consisting of monopole, steel pipe, aluminum pipe, steel cable, rope, and structural carbon fiber rods.

3. The apparatus according to claim 1, wherein the frames are constructed by:
    forming the frame shape from the high strength support members; and
    covering the frame shape formed by the high strength support members with light weight, air resistant covering.

4. The apparatus according to claim 1, wherein the flat portion of the apparatus may be configured as a polygon shape having at least five sides or as a circular shape.

5. An apparatus for delivering a focused airstream flow from an area surrounding a wind turbine to rotor blades of the wind turbine, the apparatus comprising:
    an at least partially removable frame comprising sections with high strength supports covered in light weight air resistant materials, the sections when installed comprising a permanent section of at least one half the total frame size and a remaining removable section;
    the frame comprising angled portions and a flat portion connected together such that the angled portions extend from a proximal end at an installation grade level and connect to the flat portion at a distal end of said angled portion;

the flat portion of the frame being substantially horizontal and parallel with the installation grade level and having a width at least the same measurement as the rotor blade arc diameter of a wind turbine, wherein a shortest distance from a connection edge between the angled portion distal end and the flat portion to the rotor blades is at least one half of the rotor blade arc diameter;

the flat portion of the frame being continuous from the connection edge to an edge adjacent a support column of the wind turbine and the flat portion being substantially the same elevation as the connection edge so as to provide a substantially unimpeded airstream flow surface from along the angled portion to along the flat portion;

the flat portion of the frame when connected to the angled portion having a height equivalent to the bottom tip of the rotor arc of the wind turbine less a minimal clearance amount to avoid impacting the flat portion of the apparatus frame by the rotor blade; wherein the apparatus is installed in an at least partially removable manner at least partially encircling the support column of the wind turbine so as to concentrate an airstream on the front bottom portion of the wind turbine rotor blades; and the angled portion that extends from a proximal end at installation grade level has an "S" shape with a convex curve and a concave curve to create an airfoil effect, the distal end of the "S" shaped angled portion connecting to the flat portion through the concave curve.

6. The apparatus according to claim 1, wherein the apparatus is independent and not connected to the support column of the wind turbine.

7. The apparatus according to claim 1, wherein the apparatus is connected to the support column of the wind turbine.

8. The apparatus according to claim 1, wherein the frame further comprises spill vanes installed on the angled portions in a vertical and axial orientation relative to the angled portions, the spill vanes comprising a free edge opposite a connection edge where the spill vanes connect to the angled portions.

9. The apparatus according to claim 1, wherein a semicircular chute is connected to the top of the flat portion of the frame and oriented in front of the rotor such that the semicircular chute further focuses an airstream arriving at the flat portion of the ramp into the rotor blades of a wind turbine.

10. A method for directing an airstream to the rotor of a wind turbine, the method comprising:
constructing an at least partially removable frame from high strength support members covered in light weight air resistant materials, the sections when installed comprising a permanent section of at least one half the total frame size and a remaining removable section, the frame comprising at least one angled portion and at least one flat portion, the flat portion being substantially horizontal and having a width at least the same measurement as the rotor blade arc diameter of a wind turbine;
installing said frame in an interposed position between the direction of a prevailing wind flow and the front portion of a wind turbine rotor;
wherein the flat portion of the frame when connected to the angled portion of the frame has a height equivalent to the bottom tip of the rotor arc of the wind turbine less a minimal clearance amount to avoid impacting the flat portion of the apparatus frame by the rotor blade, and wherein a shortest distance from a connection edge between the angled portion and the flat portion to the rotor blades is at least one half of the rotor blade arc diameter;
the flat portion of the frame being continuous from the connection edge to an edge adjacent a support column of the wind turbine and the flat portion being substantially the same elevation as the connection edge so as to provide a substantially unimpeded airstream flow surface from along the angled portion to along the flat portion; and
installing the frame in an at least partially removable manner at least partially encircling the support column of the wind turbine so as to concentrate an airstream on the front bottom portion of the wind turbine rotor blades.

11. The method according to claim 10, wherein configuring the flat portion of the apparatus is formed as a polygon shape having at least five sides or as a circular shape.

12. A method for directing an airstream to the rotor of a wind turbine, the method comprising:
constructing an at least partially removable frame from high strength support members covered in light weight air resistant materials, the sections when installed comprising a permanent section of at least one half the total frame size and a remaining removable section, the frame comprising at least one angled portion and at least one flat portion, the flat portion being substantially horizontal and having a width at least the same measurement as the rotor blade arc diameter of a wind turbine;
installing said frame in an interposed position between the direction of a prevailing wind flow and the front portion of a wind turbine rotor;
wherein the flat portion of the frame when connected to the angled portion of the frame has a height equivalent to the bottom tip of the rotor arc of the wind turbine less a minimal clearance amount to avoid impacting the flat portion of the apparatus frame by the rotor blade, and wherein a shortest distance from a connection edge between the angled portion and the flat portion to the rotor blades is at least one half of the rotor blade arc diameter;
the flat portion of the frame being continuous from the connection edge to an edge adjacent a support column of the wind turbine and the flat portion being substantially the same elevation as the connection edge so as to provide a substantially unimpeded airstream flow surface from along the angled portion to along the flat portion; and
installing the frame in an at least partially removable manner at least partially encircling the support column of the wind turbine so as to concentrate an airstream on the front bottom portion of the wind turbine rotor blades; and the angled portion that extends from a proximal end at installation grade level has an "S" shape with a convex curve and a concave curve to create an airfoil effect, the distal end of the "S" shaped angled portion connecting to the flat portion through the concave curve.

13. The method according to claim 10, wherein the completed frame is independent and not connected to the support column of the wind turbine.

14. The method according to claim 10, wherein the completed frame is connected to the support column of the wind turbine.

15. The method according to claim 10, wherein the frame further concentrates the airstream by connecting spill vanes to the frame such that said spill vanes are installed on the angled portions in a vertical and axial orientation relative to the angled portions, the spill vanes comprising a free edge opposite a connection edge where the spill vanes connect to the angled portions.

16. The method according to claim 10, wherein the frame may further concentrate the airstream via a semi-circular chute connected to the top of the flat portion of the frame and oriented in front of the rotor such that the semi-circular chute further focuses an airstream arriving at the flat portion of the ramp into the rotor blades of a wind turbine.

17. An apparatus for placement on a roof with a surrounding roof parapet and for delivering focused airstream flows from an area surrounding a wind turbine to rotor blades of the wind turbine, the apparatus comprising:
   (a) a first apparatus section for installation beneath the rotor blades of a wind turbine, the first apparatus section comprising:
      an at least partially removable first frame comprising sections with high strength supports covered in light weight air resistant materials;
      the first frame comprising angled portions and a flat portion connected together such that the angled portions extend from a proximal end and connect to the flat portion at a distal end of said angled portion, the proximal end of a section of said angled portions comprising an attachment means for connection to a roof parapet on a roof such that the proximal end of the angled portions section is at a parapet height above the elevation of the roof;
      the flat portion of the first frame when connected to the angled portion having a height equivalent to the bottom tip of the rotor arc of the wind turbine less a minimal clearance amount to avoid impacting the flat portion of the apparatus frame by the rotor blade;
      the flat portion of the first frame having a width at least the same measurement as the rotor blade arc diameter of the wind turbine, wherein a shortest distance from a connection edge between the angled portion distal end and the flat portion to the rotor blades is at least one half of the rotor blade arc diameter;
      the flat portion of the first frame being continuous from the connection edge to an edge adjacent a support column of the wind turbine and the flat portion being substantially the same elevation as the connection edge so as to provide a substantially unimpeded airstream flow surface from along the angled portion to along the flat portion; and
      wherein the first apparatus section is installed beneath the rotor blades and at least partially encircling a support column of the wind turbine so as to concentrate an airstream on the front bottom portion of the wind turbine rotor blades;
   (b) a second apparatus section for installation above the rotor blades of the wind turbine, the second apparatus section comprising:
      an at least partially removable second frame comprising sections with high strength supports covered in light weight air resistant materials;
      the second frame comprising angled portions and a flat portion connected together such that the angled portions extend from a proximal end and connect to the flat portion at a distal end of said angled portion;
      the flat portion of the second frame having a width at least the same measurement as the rotor blade arc diameter of the wind turbine, wherein a shortest distance from a connection edge between the angled portion distal end and the flat portion to the rotor blades is at least one half of the rotor blade arc diameter; and
      wherein the second apparatus section is installed above the rotor blades so as to concentrate an airstream on the front top portion of the wind turbine rotor blades; and
   (c) a plurality of pipe supports connecting the first and second apparatus sections.

18. The apparatus according to claim 17, wherein the first and second apparatus sections are separated by aerodynamically designed vane supports that function to focus an airstream flow to a center axis of the wind turbine.

19. An apparatus for delivering a focused airstream flow from an area surrounding a wind turbine to rotor blades of the wind turbine, the apparatus comprising:
   an at least partially removable frame comprising sections with high strength supports covered in light weight air resistant materials;
   the frame comprising angled portions and a flat portion connected together such that the angled portions extend from a proximal end at an installation grade level and connect to the flat portion at a distal end of said angled portion;
   the flat portion of the frame being substantially horizontal and parallel with the installation grade level and having a width at least the same measurement as the rotor blade arc diameter of a wind turbine, wherein a distance from a connection edge between the angled portion distal end and the flat portion to the rotor blades is at least one half of the rotor blade arc diameter;
   the flat portion of the frame when connected to the angled portion having a height equivalent to the bottom tip of the rotor arc of the wind turbine less a pre-determined clearance amount;
   the flat portion of the frame having a recessed portion in the center of the flat portion, the recessed portion being positioned directly below the bottom tip of the rotor blade and of sufficient depth to provide the clearance required by the rotor blade to avoid impacting the flat portion of the apparatus frame;
   wherein the apparatus is installed in an at least partially removable manner at least partially encircling a support column of the wind turbine so as to concentrate an airstream on the front bottom portion of the wind turbine rotor blades.

20. A method for directing an airstream to the rotor of a wind turbine, the method comprising:
   constructing an at least partially removable frame from high strength support members covered in light weight air resistant materials, the frame comprising at least one angled portion and at least one flat portion, the flat portion being substantially horizontal and having a width at least the same measurement as the rotor blade arc diameter of a wind turbine;
   installing said frame in an interposed position between the direction of a prevailing wind flow and the front portion of a wind turbine rotor;
   wherein the flat portion of the frame when connected to the angled portion of the frame has a height equivalent to the bottom tip of the rotor blade arc of the wind turbine less a pre-determined clearance amount, and wherein a distance from a connection edge between the angled portion and the flat portion to the rotor blades is at least one half of the rotor blade arc diameter, and further wherein the flat portion of the frame has a recessed portion in the center of the flat portion, the recessed portion being positioned directly below the bottom tip of the rotor blade and of sufficient depth to provide the clearance required by the rotor blade to avoid impacting the flat portion of the apparatus frame;

installing the frame in an at least partially removable manner at least partially encircling a support column of the wind turbine so as to concentrate an airstream on the front bottom portion of the wind turbine rotor blades.

21. The apparatus according to claim 10, wherein constructing the frame comprises:

erecting monopole or frame type support towers; stretching wires between the towers and from the towers to the ground; and covering the frame shape formed by the wires with a light weight air resistant covering.

* * * * *